Feb. 2, 1943. A. F. SCHLOMANN ET AL 2,309,675
MANAGEMENT INSTRUMENT FOR A BUSINESS
Filed Sept. 12, 1940  8 Sheets-Sheet 1

INVENTORS
ALFRED F. SCHLOMANN
ALFRED SCHWARZ
BY Walter S. Pleiston
ATTORNEY

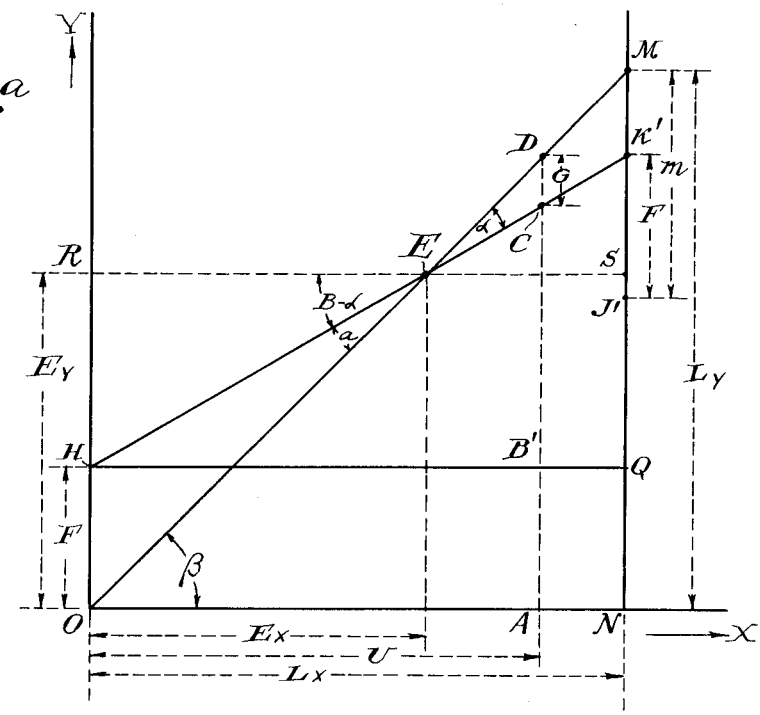
Fig. 1ª
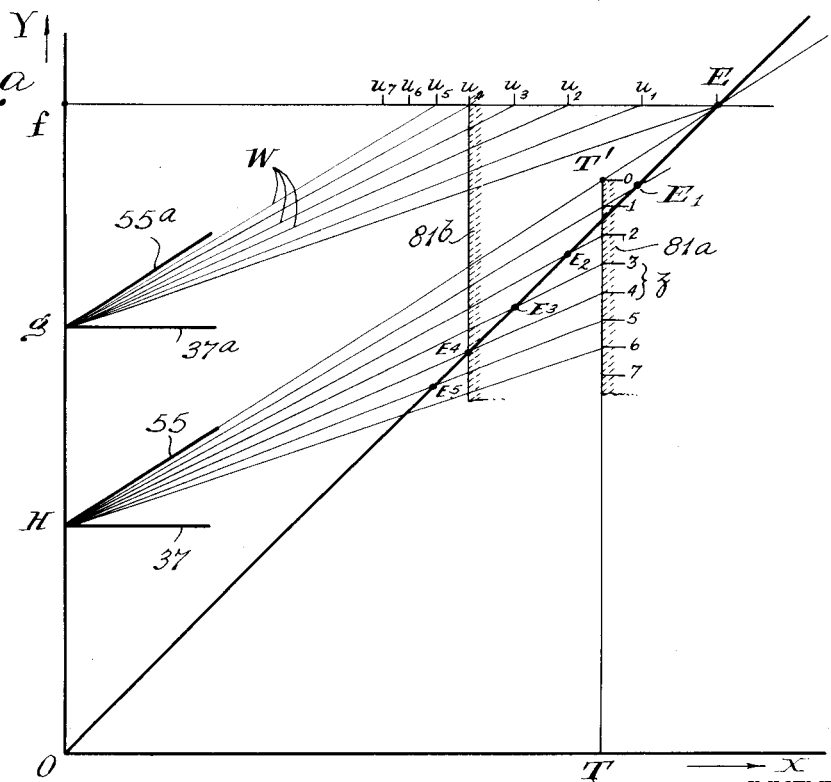
Fig. 14ª

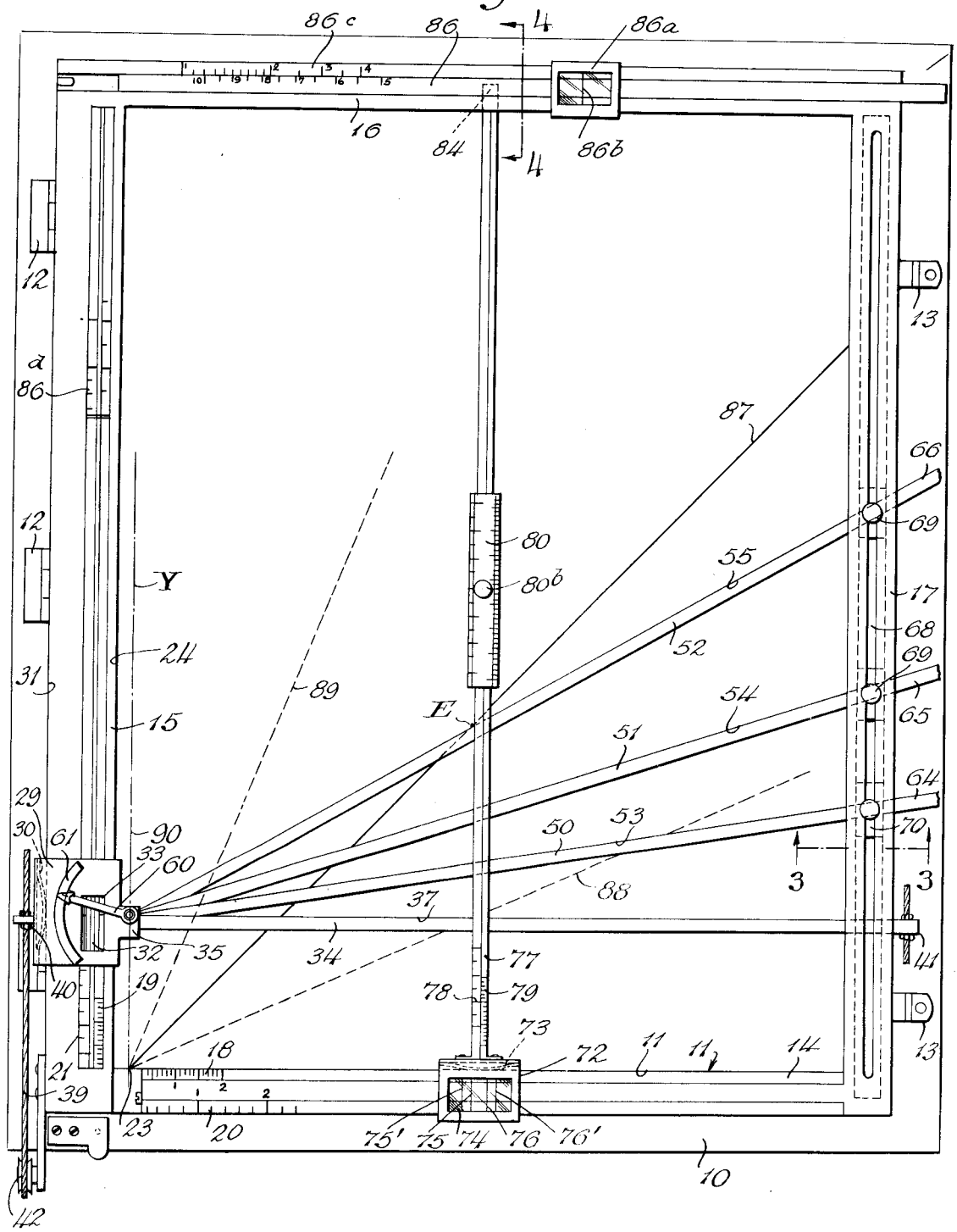

Feb. 2, 1943. A. F. SCHLOMANN ET AL 2,309,675
MANAGEMENT INSTRUMENT FOR A BUSINESS
Filed Sept. 12, 1940 8 Sheets-Sheet 4

INVENTORS
ALFRED F. SCHLOMANN
ALFRED SCHWARZ
BY Walter S. Olerton
ATTORNEY

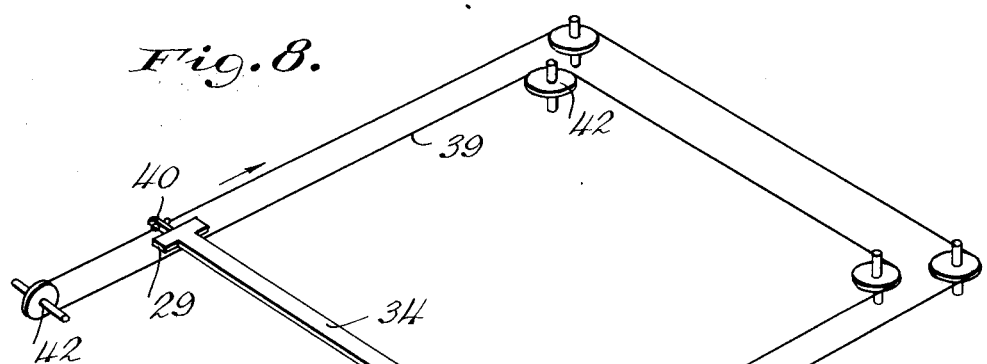
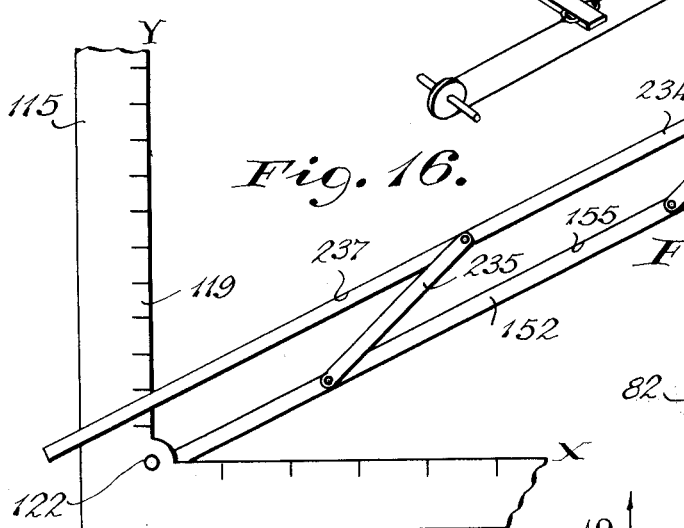
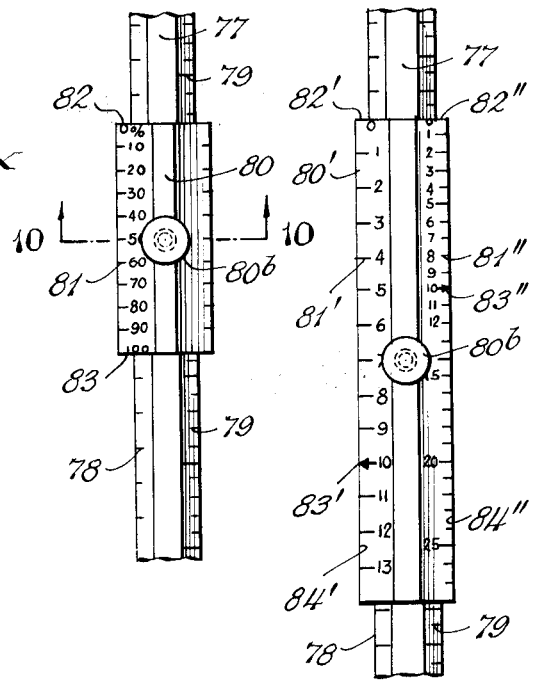
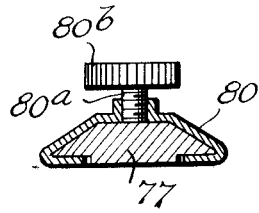

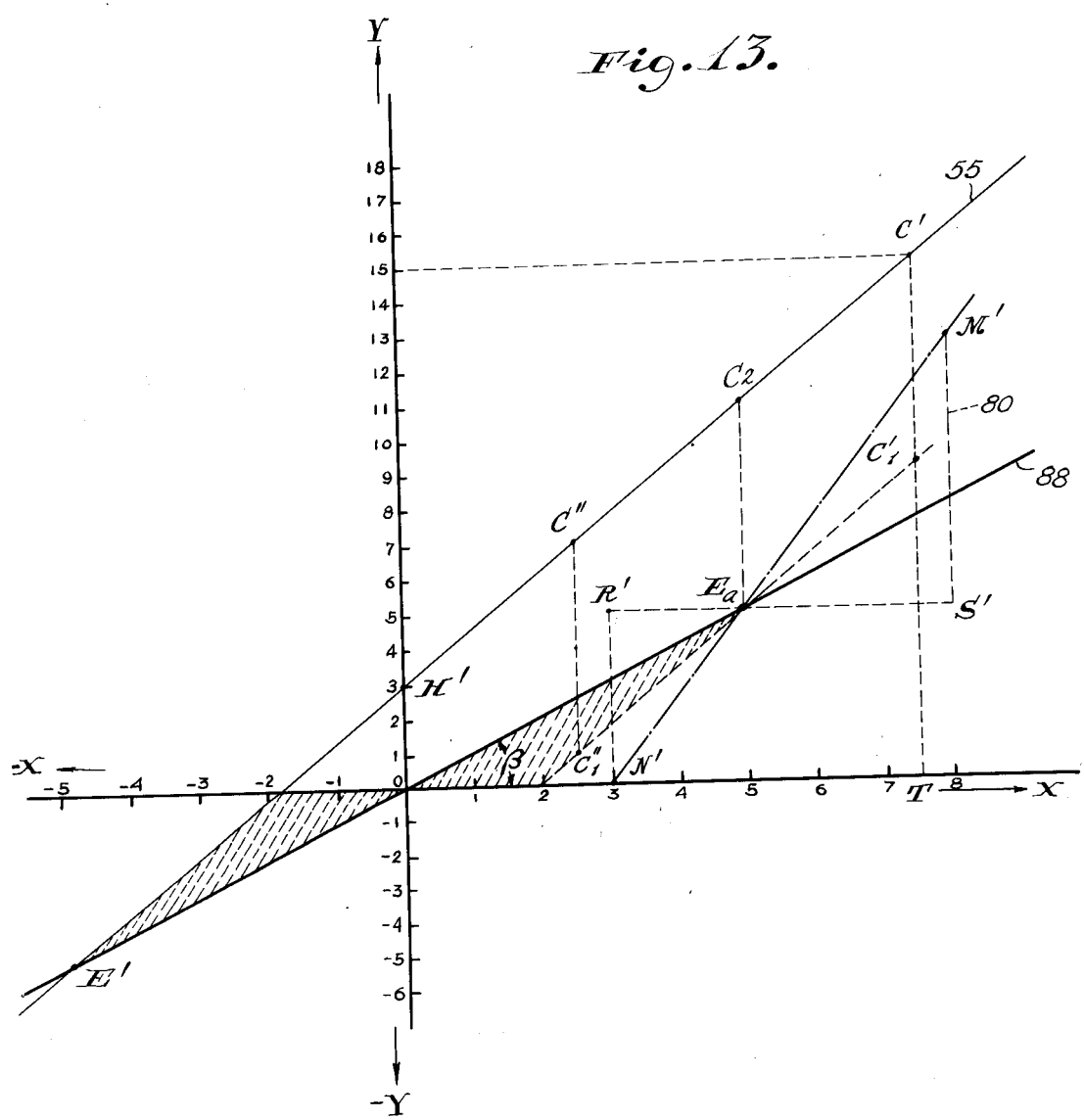

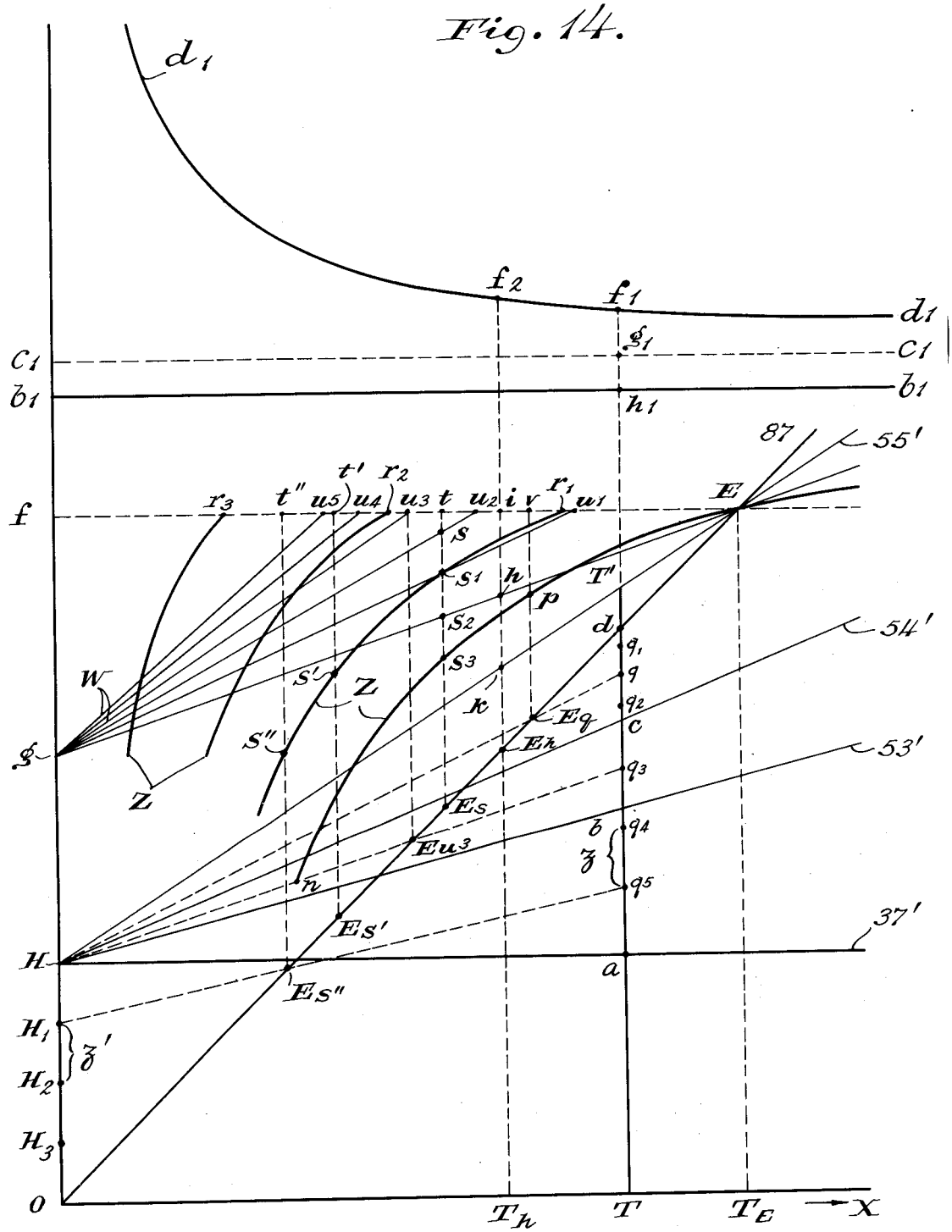

Patented Feb. 2, 1943

2,309,675

UNITED STATES PATENT OFFICE 2,309,675

MANAGEMENT INSTRUMENT FOR BUSINESS

Alfred F. Schlomann, New York, and Alfred Schwarz, Rochester, N. Y.; said Schwarz assignor to said Schlomann Application September 12, 1940, Serial No. 356,432

23 Claims. (Cl. 33—98)

The present invention relates to an instrument for reading data regarding the economic status of a business and more particularly for determining certain data and/or factors which are of importance in the business management.

The invention contemplates providing an instrument for preparing the so-called break-even chart and for finding therein the break-even point. A further object is to provide means whereby the relative position of certain members adjusted according to a given status of a business is indicative as to profit or loss and as to the turnover required in order to attain a predetermined profit or to avoid loss. It is also an object of the invention to provide means whereby certain calculations can be facilitated and curves indicative as to the influence of savings on the status of the business, and/or the percentage of indirect costs to be charged to direct costs variable in proportion to the turnover can be entered into the break-even chart whereby a diagrammatic illustration of the interdependence of such values as turnover, constant and variable costs, reductions of costs in the one or the other line, and certain indices as to the economic goodness can be attained.

The invention comprises scale-provided members constituting a rectangular co-ordinate system in connection with linear members movable and adjustable in a predetermined manner or in predetermined paths, so as to serve as elements of a diagram, or as rulers if it is intended to draft the diagram on a chart material placed underneath said members. Further objects and details of the invention will be apparent from the description given hereinafter and the accompanying drawings illustrating several embodiments thereof by way of example.

In the drawings:

Figs. 1 and 1a are geometrical illustrations of the principle involved.

Fig. 2 is a top plan view of an instrument according to the invention.

Figures 4, 12:
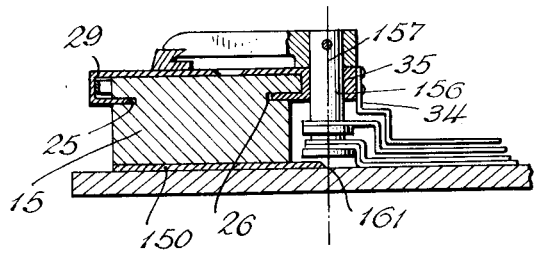
Figure 3:
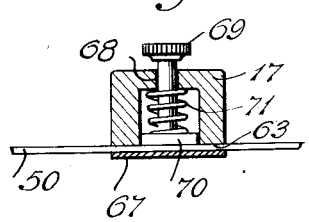

Figs. 3 and 4 are cross-sections along lines 3—3 and 4—4 respectively of Fig. 2.

Figure 5:
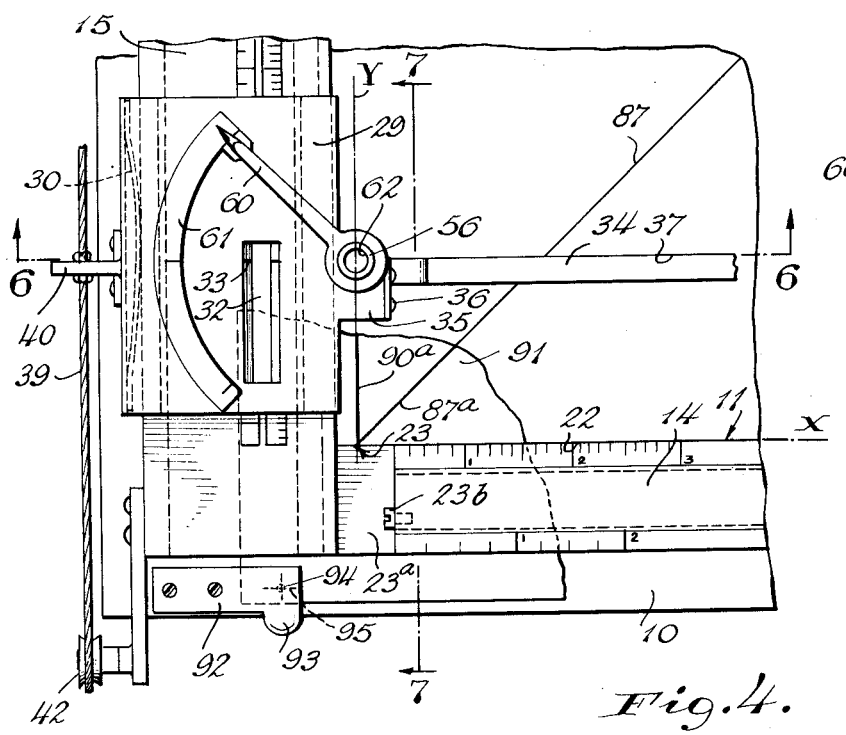

Fig. 5 is a top plan view of a part of the instrument according to Fig. 2 on a larger scale.

Figure 6:
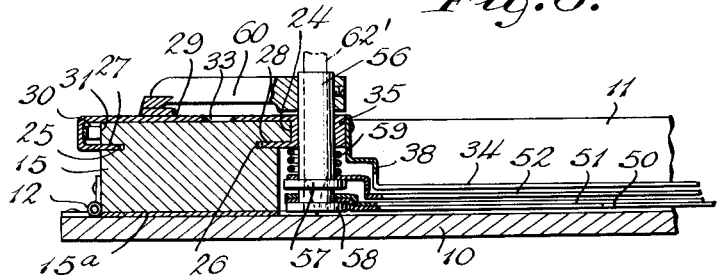
Figure 7:
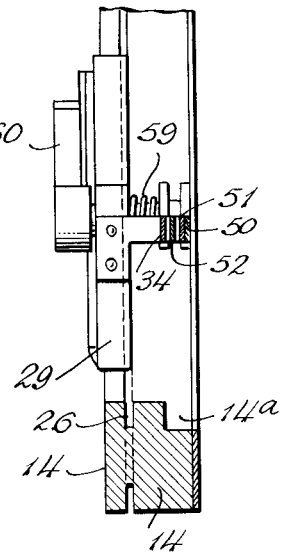

Figs. 6 and 7 are cross-sections along lines 6—6 and 7—7 respectively of Fig. 5.

Fig. 8 is a perspective view of another part of the instrument shown in Fig. 2.

Fig. 9 is a top plan view of a third part of the instrument.

Fig. 10 is a cross-section along line 10—10 of Fig. 9.

Fig. 11 shows a modification of the part of Fig. 9.

Fig. 12 is a cross-section of a modification of the part shown in Fig. 6.

Fig. 13 is a diagram with a negative break-even point.

Fig. 14 is an example of a complete break-even chart as obtained with the aid of the instrument according to the invention.

Figure 14B:
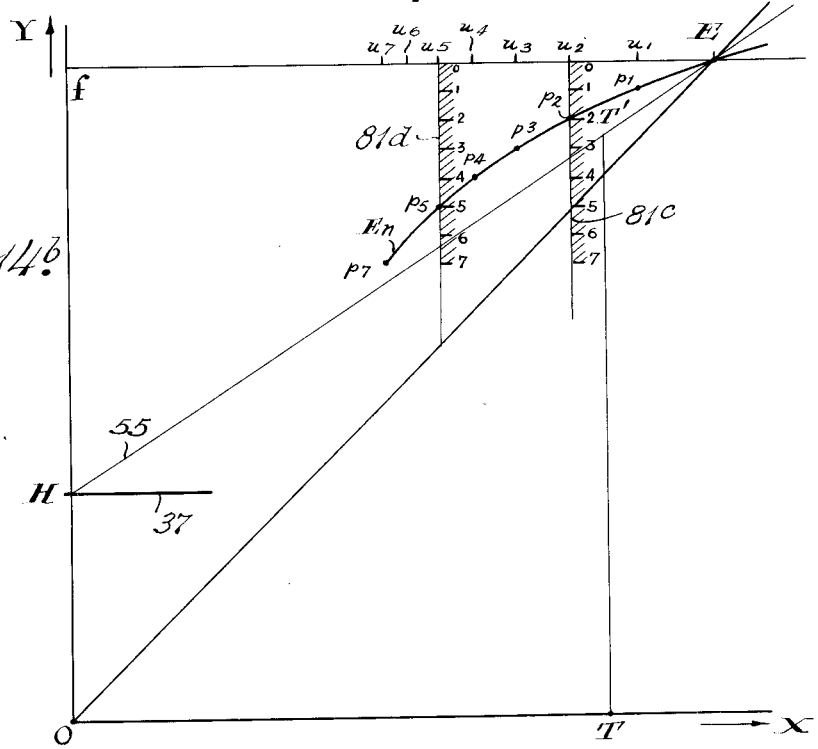
Figure 14C:
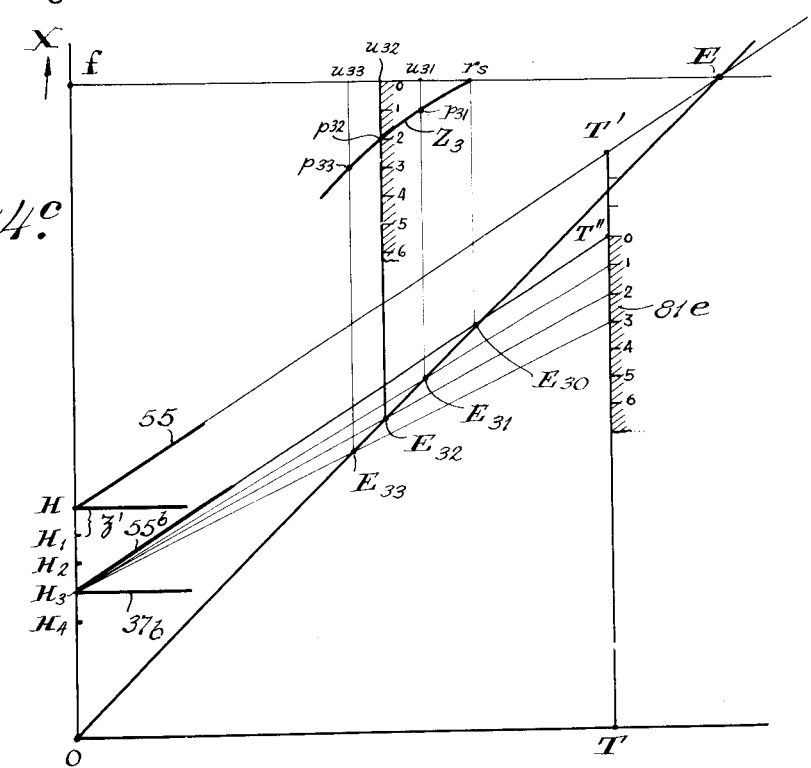

Figs. 14a, 14b, and 14c are diagrammatic illustrations of the construction of certain lines of the chart with the aid of the instrument according to Fig. 2.

Figure 15:
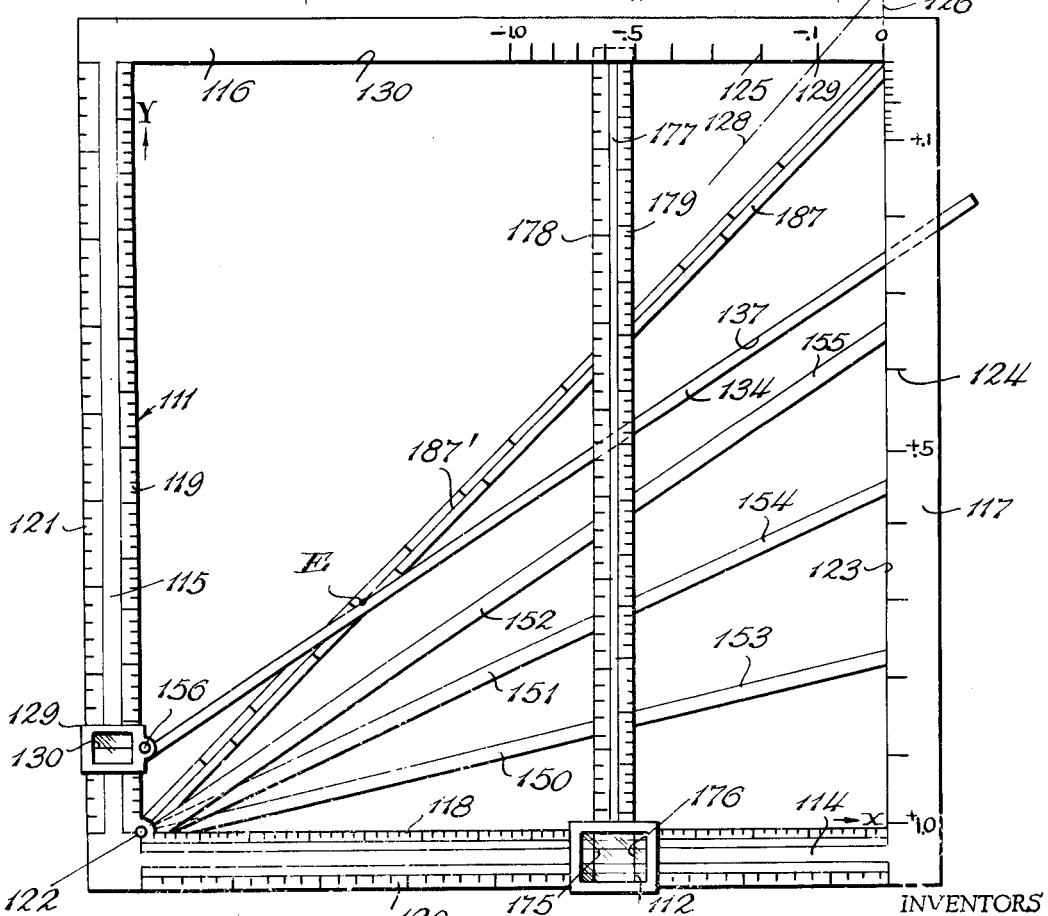

Fig. 15 is a diagrammatic top plan view of another embodiment of the invention, and Fig. 16 is a diagrammatic top plan view of a modified part of the embodiment shown in Fig. 15.

As stated above, the instrument, according to our invention, is intended to give the user certain valuable data in the management of a business. Hitherto, the success or failure of an enterprise has been determined more or less exclusively in the profit and loss statement which is part of the conventional balance sheet. However, the profit and loss statement communicates to the reader only a static picture of past periods, weeks, months, or years, and its figures are retrospectively computed from those which appear in the accounting. Conclusions deduced from the profit and loss statement are more or less guess work if made in order to judge in advance a prospective success or failure of the enterprise as a result of predetermined changes in selected factors, such as the turnover, costs of material, wages, overhead, etc.

Now, we have found that certain characteristic indices can be obtained which permit a prospective success or failure to be measured comparatively and which express the mathematical relations of certain economic variables to each other. Furthermore, we have found a method whereby certain data can be measured rather than calculated, as for instance, data for finding the lowest price at which a product may be sold without loss, or what a decrease in profit may be caused by the amount and relation of certain variable and constant costs if a predetermined selling price shall not or cannot be surpassed.

Figure 1:
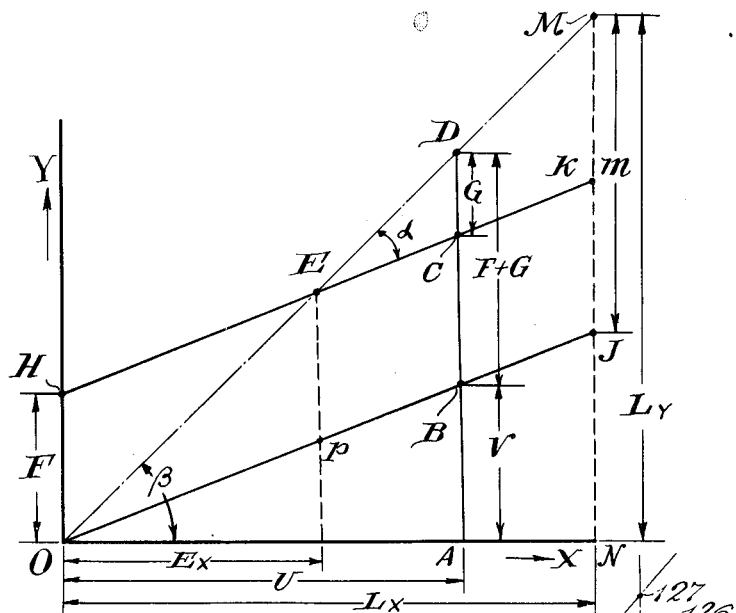

In order to make ourselves fully understood and to establish a basis for the disclosure given hereinafter of the instrument and its operation according to our invention, we intend to describe first the diagrams of Figs. 1 and 1a. Fig. 1 shows two co-ordinates $x$ and $y$ at right angles to each other and with the zero point at O. A line OM bisects the right angle so that ∠MON=β=45°. The abscissa $x$ represents business turnovers or volumes of business, and the ordinate $y$, the amount of costs of the products manufactured. The costs of the products comprise, as well known, constant costs, e. g., rent of premises, deprecitation, etc., which within wide limits are independent of the quantity produced; and variable costs, e. g., material, productive labor and certain indirect costs which vary in proportion to the quantity produced. Now, it may be assumed that in a business under consideration, the turnover has been found to be equal to U and the costs of the manufactured products to be $V+F$ wherein V are the variable, and F the constant or fixed costs. Then, in the diagram of Fig. 1, the points A, B, and C are so selected that $OA=U$; $AB=V$; and $BC=F$. Point B is connected with point O and line CH is drafted parallel to OB. Hence, it will be clear that the length of the ordinate $y$ of any point of the line OB indicates the variable costs of the quantity of products according to the turnover indicated by the pertaining abscissa $x$. Similarly, the ordinate $y$ of any point on the line HC indicates the variable plus the costs of the quantity according to the turnover or volume of business indicated by the pertaining abscissa $x$. If now, the increments of the abscissa $x$ and of the ordinate $y$ are equal, then the point of intersection E of the line OM at 45° to the axes of the co-ordinate system with the line HC is that point at which the costs of the products are equal to the turnover. In other words, a business operating under the circumstances indicated by the location of the point E does so without either profit or loss. For this reason, we denote point E as the "break-even point" and the diagram or chart which shows the point E, as the "break-even chart." Furthermore, we denote the line OM which is a geometric locus of the break-even point as the "lead line."

It has been stated hereinbefore that the variable costs change in proportion to the turnover. It is true that in some businesses this is not quite correct, but that the variation of said costs is slightly progressive or degressive in relation to the change of the turnover. However, we have found that such deviation from the proportionality is generally too slight as to introduce errors of inadmissible quantity. For that reason, it is permissible to represent the variable costs in the diagram as a straight line such as OB.

Now, it follows from the break-even chart that any turnover larger than that pertaining to the break-even point E will cause a profit, and any turnover smaller than that of the break-even point will result in a loss. The profit or loss associated with any turnover is equal to the distance of the line HC from line OM measured on the ordinate of the turnover under consideration. Thus, in the present example of a turnover U, the profit G will be equal to the length CD measured according to the scale of ordinate $y$. Hence, it will be clear that if, e. g., the constant costs increase, line MC will have to be shifted accordingly upward and parallel to OB whereby the break-even point moves upward on line OM. If the variable costs increase, line OB will swing about O, and also move the break-even point upward, because HC has to follow the inclination of OB. Under extremely unfavorable conditions it may even happen that the angle AOB will become greater than 45° in which case CH will intersect line OM on its prolongation beyond O in a negative break-even point, showing that a profit can never be attained under the circumstances in consideration. Furthermore, it will be apparent, that ∠DEC denoted as $\alpha$ is an index for the increase of the profit or loss when the turnover is enlarged or decreased. The theoretical maximum of $\alpha$ is +45° which could occur only if a business could operate without any variable costs. The theoretical minimum of $\alpha$ is −45°. Thus, $\alpha$ can be used as a measure for determining the goodness of a business. However, we prefer for this purpose another index which involves also the position of the break-even point, because it will be clear from the diagram that it is desirable to have E located as close to O as possible in order to reach profit with a small turnover. In order to explain this, a line MN is drawn in Fig. 1 parallel to the ordinate $y$. The intersections of this line with HC and OB are denoted with K and J respectively; the length $L_y$ of MN is equal to the length $L_x$ of ON since ∠MON=45°. The length of MJ is denoted with $m$. It follows from △JON that $$JN = L_y - m = L_x \cdot \tan(45 - \alpha)$$

or as $$L_x = L_y$$

$$m = L_y[1 - \tan(45 - \alpha)]$$

or $$\frac{m}{L_y} = 1 - \tan(45 - \alpha)$$

This is what we term the economic goodness $e$ of a business. The connection of the economic goodness with the location of the break-even point can be found by considering the triangles MOJ and EOP wherein P is the point of intersection of the ordinate of E with line OJ. From the similarity of these triangles it follows that $$e = \frac{m}{L_y} = \frac{EP}{E_x}$$

and since EP is equal to the constant costs F:

$$e = \frac{F}{E_x} = \frac{F}{E_y}$$

Furthermore, considering also triangle DOB, $$e = \frac{DC + CB}{U}$$

However, DC is equal to the profit G when the turnover is U, and CB is equal to F. Hence, $$e = \frac{F + G}{U}$$

which is a very reliable value in the determination of the economic goodness of a business. It will be clear that in the case of $U < E_x$, G becomes negative so that in the case of a loss rather than a profit, the equation for the economic goodness will be $$e = \frac{F - G}{U}$$

A modification of the diagram according to Fig. 1 is shown in Fig. 1a. In this case, HQ is plotted parallel to the abscissa $x$ so that $HO=F$. The ordinate AB′CD is so defined that $OA=U$; $AB'=F$, and $B'C=V$. It will be noticed that the line connecting C with H has the same position relatively to line OM in Fig. 1a as in Fig. 1, and the locations of the break-even points correspond to each other. In all other respects, the two diagrams I and Ia are equivalent to each other with the exception, however, that in order to find the length $m$ it is necessary to add to MK′ the length F as indicated at J′ in Fig. 1a. It should also be noticed that if in Fig. 1a the line RS is plotted through E parallel to the x-axis, then $$e = \frac{m}{L_v}$$

may also be expressed as the quotient of the lengths MK' and MS because of the similarity of the triangles ORE and SEM. It will be explained hereinafter how the equation $$e = \frac{MK'}{MS}$$

is used in the instrument according to our invention.

Hitherto, it has been assumed that the increments of the co-ordinates $x$ and $y$ are equal with the result that the one locus of the break-even point is a line MO at 45° to both the abscissa $x$ and ordinate $y$. However, this has been done merely in order to simplify the explanation. It is also possible to use different increments in connection with the co-ordinates. In that case, it should be noted that the angle $\beta$ between the abscissa $x$ and the line which constitutes the locus of the break-even point is defined by the equation:

$$\tan \beta = \frac{\text{increment of ordinate}}{\text{increment of abscissa}}$$

In certain cases, it will be found helpful to select $\beta$ different from 45° in order to decrease or increase the spacing of two co-ordinate points such as D and C on the lines OM and HK' respectively.

The instrument according to our invention is so designed that its elements can be easily adjusted to either represent the lines of practically any or at least an unlimited variety of break-even charts, or to serve as a very handy means for plotting break-even charts on a sheet of paper or the like.

The embodiment illustrated in Figs. 2 to 10, comprises a board or base plate 10 and a frame in general denoted with 11. In order to prevent warping, it is recommended to make plate 10 of plywood and the frame of metal, particularly light metal, or to make both parts of light metal such as an aluminum alloy, although other materials may be suitably chosen. Means may be provided whereby frame 11 can be held in a predetermined position on and relatively to the board or base plate 10. Such means may consist of hinges 12 and clamps 13 or the like, as clearly shown in Figs. 2 and 6. This arrangement permits a chart material such as a sheet of paper to be placed on the board underneath the frame if it is the intention to draw the chart for a permanent record.

Frame 11 consists of four members 14, 15, 16 and 17 jointed at right angles to each other. At least the members 14 and 15 are straight lined and each provided with a scale 18 and 19 respectively having constant increments. In the drawing only short portions of the scales are shown. Any desirable number of additional scales may be used in connection with the members 14 and 15. For instance, second scales 20 and 21 respectively having increments differing from those of the scales 18 and 19 may be applied for alternative use depending on the scale measure best fitted in each individual case. Thus, all the scales may differ from each other. However, it is necessary to make the increments of the scales 18, 19 and 20, 21 respectively alike each other, if it is intended to operate with a lead line at 45° to the members 14 and 15, wherein the term "lead line" applies to the line OM discussed hereinbefore in connection with Figs. 1 and 1a. If the lead line angle is so selected that $$\beta \leq 45°$$

then the increments of the scales must fulfill the equation $$\tan \beta = \frac{\text{increment of scale on member 14}}{\text{increment of scale on member 15}}$$

Hence, if, e. g., the increments of the scales 20 and 21 are twice as large as those of the scales 18 and 19, tan $\beta$ will be 1 and $\angle \beta = 45°$ when the scales 18, 19 or 20, 21 are used; tan $\beta$ will be .5 and $\angle \beta \sim 26.5°$ when scales 20, 19 are used, and tan $\beta$ will be 2 and $\angle \beta \sim 63.5°$ when scales 18, 21 are used. The top edge 22 of member 14 serves as abscissa or x-axis of the co-ordinate system in which the break-even chart is to be plotted, and the zero point is at 23, i. e., at a short distance from edge 24 of member 15, for reasons to be explained hereinafter.

Means are provided whereby an element may be slidably arranged on frame member 15. For this purpose, member 15 may be provided with two lateral grooves 25 and 26 engaged by the inwardly bent flanges 27 and 28 respectively of a slide 29 which is movable along the member 15 (see Fig. 6). A spring 30 interpositioned between the slide and the outer edge 31 of member 15 ensures that the slide snugly engages the frame edge 24 which projects inwardly with respect to the frame 11. The top surface of the slide is provided with an elongated aperture 32 through which the scales 19 and 21 can be read opposite a mark 33 on the slide for setting the latter in a selected position. An elongated member such as a ruler 34 is secured to the slide 29 so as to extend parallel to the member 14 across the open space of the frame. For this purpose, the slide may be provided with a lateral projection 35 to which the ruler 34 may be riveted as indicated at 36. Ruler 34 serves to indicate the constant cost and corresponds to the line HQ in Fig. 1a. It, preferably, consists of a thin metal strip with a ruling edge 37. It is bent off at 38 for reasons to be hereinafter explained and as clearly shown in Figs. 5 and 6. Although in general, the construction safeguards that the ruler 34 remains parallel to member 14 or its edge 22 owing to the length of the slide, additional means of conventional or suitable type may be applied in order to ensure the parallelism. Such means may essentially consist of an endless flexible member 39 attached to the slide at 40 and to the free end of ruler 34 at 41. The flexible member 39 may be guided by rollers 42 as diagrammatically shown in Fig. 8. In order to avoid overcrowding of the drawing the rollers 42 except one are omitted in Fig. 2. Member 14 may be recessed at 23a and 14a (see Figs. 5 and 7) so that the slide 29 may be shifted sufficiently far down to attain co-incidence of the axis of pivot 56 with the zero point 23. Set screw 23b serves as an abutment for the slide in this position.

Although in Fig. 1 only one line OJ and in Fig. 1a only one line HK' representing the sum of the variable costs have been shown, it will be easily understood that in many cases it will be preferable to divide the variable costs in certain predetermined groups as, e. g., productive labor, material, indirect variable costs. For this reason, a plurality of elements or rulers may be provided in our instrument, whose inclinations with respect to the x-axis may be varied and each of which may be co-ordinate to one of said groups of variable costs. In the illustrated embodiment, there are three rulers 50, 51 and 52 having top edges 53, 54 and 55 respectively which constitute the operative edges. It is necessary that these edges in any position are radial with respect to that point in which the edge 37 of ruler 34 or its prolongation intersects the $y$-axis of the co-ordinate system. For this purpose, a pivot bolt 56 is rotatably inserted into the projection 35 of slide 29 so as to project downwardly therefrom as clearly shown in Fig. 6. Intermediate its free end and the projection 35, the bolt is provided with a flange 57 to which ruler 52 is secured. Rulers 50 and 51 are freely rotatable on pivot bolt 56 below flange 57, and a washer or the like 58 is attached to the ultimate end of the bolt after the rulers 50 and 51 are mounted thereon to prevent them from falling off. The rulers 50, 51 and 52 are bent off similar to the bent portion 38 of ruler 34 in order to place them as closely as possible to the surface of the base board 10. For the same purpose, a coil spring 59 may be inserted between the projection 35 and flange 57 in order to exert a slight downwardly directed pressure on the bolt 56. To the top end of the bolt an arm 60 may be secured with the aid of which the bolt and consequently the ruler 52 may be turned. Arm 60 may be designed as a pointer opposite a scale 61 on the slide for a purpose to be hereinafter explained. Now, it will be clear that when the slide 29 is shifted up or downward, the center of bolt 56 will move on a straight line path which coincides with the $y$-axis of the co-ordinate system, the arrangement being furthermore such that said imaginary line or $y$-axis passes through the zero point 23 on member 14. Means may be provided in connection with the slide in order to guide a drawing utensil on the $y$-axis so as to draw said $y$-axis on a sheet placed on said board, when the slide with such utensil is moved up and down. For instance, the bolt 56 may be hollow as indicated at 62, so that a pen or pencil 62' may be inserted with its point coinciding with the point of intersection of the pivot axis with the $y$-axis.

It has been stated that the rulers 34, 50, 51 and 52 may consist of strips of thin metal; however, any other suitable material may be used, and in many instances a transparent material may be preferred so that lines such as 87 provided on the board are visible through the rulers. It will be noticed that the rulers are superimposed on each other near the pivot bolt 56, whereas at some distance therefrom all the rulers may lie flat on the board surface owing to their flexibility and elasticity ensured by their thinness. In order to hold them so, frame member 17 may be slotted at 63 close to its bottom, as shown in Fig. 3, and the rulers passed therethrough with their free ends 64 to 66 respectively which are long enough to project outside of frame member 17 even if the rulers are relatively steeply inclined with respect to the $x$-axis. Additional means may be provided to hold the rulers in an adjusted position. For this purpose, member 17 may have a substantially U-shaped cross-section except for its ends where it is jointed to the members 14 and 16. The afore-mentioned slot 63 may be formed by a base strip 67 held at the ends of the member 17 so as to be slightly spaced from the U-shaped cross-section according to the width of slot 63. Another slot 68 is provided in the web of the U-shaped portion, and studs 69 engage said longitudinal slot 68. Each stud has a plate 70 secured to its end so as to be slidable in the channel of the U-shaped portion. A spring 71 between the web of the U and the plate 70 tends to press the stud with the plate downward, so that if the stud with the plate is brought in a position on top of a ruler, the latter will be pressed by the plate 70 against the base strip 67 and its position will be ensured by friction.

On the horizontal frame member 14, a slide 72 is movable which may engage member 14 with bent off flanges in lateral slots as shown in connection with the slide 29, and may be provided with a spring 73 similarly arranged and for a similar purpose to the afore-mentioned spring 30 of slide 29. The slide 72 has an aperture 74, through which the scales 18 and 20 can be read. There are furthermore, two marks 75 and 76 in line with the edges respectively of a vertical elongated member or ruler 77 which is secured to the slide 72 and movable with the latter. Ruler 77 has two scales 78 and 79 respectively applied to the two edges of the ruler, and having increments equal to those of the scales 21 and 19. For a purpose to be explained hereinafter, another slide 80 of a suitable length which may be selected as desired may be arranged so as to be movable along the vertical ruler 77. Means such as a set screw 80a with knurled head 80b may be provided to secure slide 80 in an adjusted position relatively to ruler 77, as shown in Figs. 9 and 10. A scale 81 provided on slide 80 is divided in equal parts to indicate percents, the zero mark being at its upper end 82 and the mark for 100 percent at its lower end 83. Slide 80 may be pushed out of the way, i. e. upward or downward if a portion of the scales 78 or 79 is to be used which otherwise would be covered or obstructed by the slide 80. Ruler 77 is preferably arranged on top of the rulers 34, 50, 51 and 52, and its top end 84 may be held and guided in a lateral slot 85 of member 16 as clearly shown in Fig. 4. Means (not shown) to ensure that ruler 77 is always parallel with the $y$-axis may be applied in a manner similar to that disclosed in connection with the ruler 34. A slide rule 86 may be combined with frame member 16 or any other suitable part of the instrument in order to make a separate slide rule or equivalent unnecessary for a purpose explained hereinafter.

The top surface of the board 10 may be provided with a line 87 extending from the zero point of the system at an angle of 45° to the co-ordinates for use in connection with the scales 18 and 19 or 20 and 21 wherein the increments of scale 18 and 19 are alike, and those of 20 and 21 are alike. In addition thereto, lines 88 and 89 may be plotted on the board which lines respectively include angles with the co-ordinates according to the relation of the scales 18 to 21 and 20 to 19 as hereinbefore explained. Also, a line 90 indicating the $y$-axis may be provided on the board. It is advisable though not necessary to make the lines 87, 88 and 89 distinctive from each other, e. g., by different colors. In order to affix a chart material, e. g., a graph sheet 91 on the board 10 suitable means may be provided on the latter so as to permit the sheet to be attached and secured in correct position with respect to the axes of the co-ordinate system. This is particularly desirable if such graph sheet has printed thereon certain standard lines such as, e. g., one of the lead lines indicated at 87a in Fig. 5 and/or the $y$-axis 90a. The mentioned means may consist, for instance, of suitable clamps secured to the base-plate under the frame, which clamps are shown at 92 in Fig. 5. The illustrated clamp has a projection 93 in order to facilitate its manipulation. It may consist of a resilient and transparent material to permit the sheet 91 to be so positioned that a mark 95 thereon coincides with a pin-like downward projection 94 of the clamp.

The instrument may be used and operates in the following manner. Let it be assumed that the books of a business under consideration indicate that the turnover for an elapsed period was U, and that the production required constant costs in the amount of F, and variable costs in the total amount of V composed of $V_1$ for material, $V_2$ for labor and $V_3$ for indirect costs. It is intended to establish the break-even chart in order to find the break-even point and the economic goodness. Scales 20 and 21 may be selected as most convenient in the particular case. Since these scales have like increments the lead line 87 at 45° is to be considered as above explained. Then, first slide 72 may be shifted towards the right-hand side in Fig. 2 until mark 75 coincides with the mark on the scale 20 for the turnover amount U. Mark 75 is used because this mark is in line with the ruler edge carrying the scale 78 whose increments are of a size equal to those of scale 21. Thereafter, slide 29 is shifted upward until its mark 33 coincides with that mark on scale 21 which stands for the amount F. The same amount F will be indicated by edge 37 on scale 78 of the vertical ruler 77. The amount $V_1$ is then added to F and ruler 50 so adjusted that its edge 53 intersects the left-hand edge of ruler 77 at the scale point $F+V_1$. Similarly, $V_2$ is added to the last-mentioned sum and ruler 51 turned until edge 54 is in registry with the scale point $F+V_1+V_2$ at scale 78. Finally, the edge 55 of ruler 52 is brought to coincide with the scale point $F+V_1+V_2+V_3=F+V$. The rulers may be secured in their adjusted position with the aid of the devices 68—70 shown in Fig. 3. Now, it will be apparent that the profit or loss of the business over the contemplated period is directly readable as the difference of the amounts indicated on the scale 78 by line 87 and edge 55 wherein a profit is attained when, at the position of the vertical ruler, line 87 is higher than edge 55, and a loss when the relative position of 87 and 55 is the reverse. Furthermore, the break-even point E appears as the point of intersection of line 87 and edge 55. The value of its ordinate can be measured by shifting slide 72 until the edge of scale 78 coincides with the break-even point as shown in Fig. 2. Now, slide 72 may be shifted to any desired position indicating an imaginative turnover at scale 20; in any event, the length of the scale 78 between line 87 and 55 will indicate the profit or loss which must be expected at such turnover, the distance of the edge 55 from 37 will indicate the sum of the required variable costs, and the distances between edges 55 and 54, 54 and 53, and 37 respectively, the pertaining amounts for indirect variable costs, labor and material. The economic goodness can be read as the position of the pointer 60 relatively to scale 61 provided the latter is gauged accordingly. This may be done under consideration of what has been hereinbefore stated as the geometric definition of $e$ where $e$ has been found as equal to the term $1-\tan(45°-\alpha)$. However, it must be borne in mind that the so-defined scale 61 is valid only if the lead line 87 includes an angle of 45° with the $x$-axis. For any other angle, another scale 61 must be used. Thus, in the case of the instrument of Fig. 2 where the scales 18 to 21 permit the selective use of one of three lead lines 87, 88, 89, the scale 61 should be threefold, i. e., it should be provided with three different gradations, one for each lead line. The general equation for computing the increments of scale 61 can be easily determined with the aid of Fig. 1a. According to its above definition $$e = \frac{F}{E_y}$$

and in view of Fig. 1a, $$e = \frac{HO}{RO} = \frac{RO-RH}{RO}$$

Now, $$RO = E_x \tan \beta \text{ and } RH = E_x \tan (\beta - \alpha).$$

Hence, $$e = \frac{E_x \tan \beta - E_x \tan (\beta - \alpha)}{E_x \tan \beta} = \frac{1 - \tan (\beta - \alpha)}{\tan \beta}$$

Since $$\tan \beta = \frac{\text{increment of scale on } x\text{-axis}}{\text{increment of scale on } y\text{-axis}}$$

increments of the scale 61 can be correctly computed. However, another means for measuring the economic goodness has been also described in connection with Fig. 2. Such means consists in the percentage scale slide 80 on vertical ruler 77. This slide is used in the following manner. First, by shifting this slide and the vertical ruler 77, the lower end 83 of scale 81 is brought into registry with the break-even point; thereupon, without altering the position of slide 80 on the ruler 77, the latter is shifted until the upper end 82 of the scale 81 coincides with line 87[1]. In this position,

---

[1] Or whatever other lead line, e. g., 88 or 89, has been used in establishing the break-even point.

the edge 55 indicates the economic goodness on scale 81. The correctness of this statement will be apparent if Fig. 1a is considered and the above explanation with respect to $e=MK':MS$.

If the break-even point and thus also the economic goodness are negative which means that no profit of the business can ever be expected regardless of the amount of a turnover, the break-even point would not appear within the co-ordinate quadrant defined by the frame 11 but would fall into the imaginary diagonally opposite quadrant. Nevertheless, its position can be shown and the negative economic goodness can be measured with the aid of one or two auxiliary lines plotted according to diagram 13. This is important if it is desired to judge whether there is still a chance of making the business profitable by drastic measures. In the example of Fig. 13, the increments of the $x$-axis are selected twice as large as those of the $y$-axis, in order to illustrate the applicability of the principle regardless of the size of the angle $\beta$. Consequently, the inclination of the lead line on which the break-even point will be located is defined by the equation $\tan \beta = \frac{1}{2}$. Now, if it is assumed that, in a case under consideration, the turnover is 7.5 units, the constant costs are 3 units and the total variable costs 12 units, then, according to the above explanations, the second locus of the break-even point is the line through the point H' with the co-ordinates $x=0$ and $y=3$ and through C' with the co-ordinates $x=7.5$ and $y=3+12=15$. Line H'C' intersects the lead line through O in the break-even point E' occurring in that quadrant of the system in which $x$ and $y$ are negative. It is of course possible to design an instrument along the lines described in connection with Fig. 2 wherein the various elements extend into the $-x$, $-y$ quadrant of the system. However, such structure would unnecessarily increase the size of the instrument and consequently would make the latter rather cumbersome to handle. This can easily be avoided and the instrument of Fig. 2 can also be used to indicate and to measure negative values. If, therefore, the quantities of the turnover, the constant and the variable costs are as stated in connection with diagram 13, slide 29 of Fig. 2 may be brought in the position H' of the diagram Fig. 13. That means, its mark 33 is in registry with the 3 units mark on scale 19. Similarly, slide 72 is so shifted that mark 76 is in registry with the 7.5 units mark of scale 20. Then ruler 52 is so turned that its edge 55 intersects the scale 79 at 15 units being equivalent to the sum of the constant and variable costs. The fact that there is no point of intersection of the edge 55 with the lead line 88 indicates the negative value of the break-even point, which also may be apparent from the position of pointer 60 relatively to scale 61, provided the latter is gauged with reference to the lead line 88. In the diagram 13, the break-even point E' as the point of intersection of the extension of lines 88 and 55 in the $-x$, $-y$ quadrant is found to have the co-ordinates $x=y=-5$. Now, the imaginary operation applied in this case to bring the break-even point into the field of the $+x$, $+y$ quadrant of the system consists in turning the $-x$, $-y$ quadrant 180° about the zero point, so that the $-y$ leg coincides with the $+y$ leg and the $-x$ leg with the $+x$ leg. It will be apparent that thereby the negative extension of the lead lines 88 will be caused to coincide with the positive extension of the same line. The negative portion of line H'C' will take the position of a parallel to line H'C' through a point of the $x$-axis which is equally far from zero on the positive side as it originally was on the negative side. The point of intersection of this parallel line with line 88 is the desired auxiliary break-even point $E_a$ whose co-ordinates with negative signs conform with the co-ordinates of the actual break-even point E'. Now, with the instrument of Fig. 2 the said parallel can be construed by setting off from two optionally selected points of line 55, e. g., C' and C'' downward a distance equal to twice the length of H'O in Fig. 13. This is easily accomplished by shifting the vertical ruler 77 first in the position of point C' and then of C'' and determining the points $C_1'$, and $C_1''$ with the aid of scale 79. The line $C_1'$ and $C_1''$ is better drawn than represented by the edge of an additional element of the instrument because it does not appear necessary to further complicate the latter by the addition of another ruler which may be used only in the relatively unfrequent cases of negative break-even points. The co-ordinates of the thus found break-even point $E_a$ may be then measured with the scale 79. However, it is not even necessary to plot the line $C_1'C_1''$ in order to find the point $E_a$ as the intersection of that line with the lead line 88. If the modified slide 80' of Fig. 11, more fully described hereinafter, is used, it is sufficient to lead the zero point of its scale 81' along the line 55 until it reaches the point denoted with $C_2$, where the lead line is in registry with the sixth scale mark. This particular point of the line 88 is the auxiliary break-even point $E_a$ because the increments of scale 81' and those of the scale at the $y$-axis are equal and the distance $C_2E_a$ is twice that of H'O. In order to find the economic goodness, it is necessary to plot the auxiliary line $N'E_aM'$, the point N' being so located on the $x$-axis that in scale measure $ON'=OH'$. If this is done, the economic goodness can be measured in a manner similar to that described in connection with a positive value. This means, first that ruler 77 and slide 80 are so shifted that the lower end 83 of scale 81 coincides with point $E_a$. Thereupon, the ruler is moved towards the right-hand side until the upper end 82 of the slide is in registry with the line $N'E_aM'$ so that the slide scale is in the position M'S' in Fig. 13. Then, line 88 will indicate at the slide scale the economic goodness which is to be read with a negative sign. It will be noticed that the triangles $R'N'E_a$ and $S'M'E_a$ are similar to each other, and that regarding the value $e$, similar conditions prevail in Fig. 13 as in those discussed with respect to Fig. 1a.

From the fore-going it will be understood that slide 80 may also be used for other measurements. For instance, if it is intended to find the ratio of that group of the variable costs which is defined by the spacing of the edges 54 and 55 in Fig. 2 to the total of the variable costs defined by the spacing of the edges 37 and 55 for any turnover, it will be necessary only to shift the slide 80 so that its upper end coincides with edge 55 and its lower end with edge 37. Then edge 54 will indicate the required percentage value at the scale. Hence, the slide 80 movable in two directions at right angles to each other in combination with three rulers angularly adjustable in relation to each other about a common pole is a means for measuring the ratio of a part of the total length of a line parallel to the slide scale.

Hitherto, it has been assumed that the various lines of the break-even charts with positive break-even points are directly represented by the elements of the instrument or more correctly by their operative edges. In this manner no permanent record will be obtained. If it is intended to draw the break-even chart on a sheet of paper or the like for future reference, the clamps or snaps 13 will be opened, the frame swung back about the axes of its hinges 12, and the sheet applied to the board and secured in correct position with the aid of the devices 92—95. The sheet may be prepared so as to have printed thereon all or any of the lines constituting the $x$- and $y$-axes, the lead line 87a and the scales in connection with the axes. It is particularly helpful if the sheet is provided with a network of vertical and horizontal lines according to the scales of the co-ordinate axes. When the sheet is in position, the frame may be turned back and secured to the board with the aid of the clamps 13. If the co-ordinate axes and the lead line are not originally printed or otherwise provided on the sheet, the $x$-axis may now be drawn along the edge 22, and the $y$-axis by inserting a pen or pencil in the tubular opening 62 and then moving slide 29 along frame member 15. The lead line 87a can be drawn with the aid of ruler 55 after the slide 29 has been shifted down so that the axis of the pivot 56 coincides with the zero point at 23 and the edge 55 with any point which fulfills the condition $x=y$ according to the selected scales of the co-ordinates. If the structure of the instrument prevents the slide from being shifted sufficiently downward line 87a may be drawn with the aid of a separate ruler. Thereafter, the elements 34, 50, 51, 52 and 77 may be shifted into their respective positions as hereinbefore described, and the desired lines may be drawn along their operative edges.

It will be apparent, that if the chart shall be drawn on a sheet, it is possible to omit the rulers 50 and 51. In that event, slide 29 will be shifted upward according to the amount of the constant costs and a line drawn along edge 37. Thereafter, ruler 52 will be brought stepwise in the positions of the rulers 50, 51 and 52 as described with respect to Fig. 2, and after each step a line will be drawn along its operative edge 55. If so desired, the economic goodness may then be measured with the elements of the instrument and noted on the chart before the sheet is removed from the instrument board.

In many instances, however, it will be desirable to enter additional lines in the break-even chart in order to determine correctly the influence of changes in various factors on the position of the break-even point, and also to establish other data which are helpful in deciding on the policy of the future business management. Such lines are particularly those which will be denoted hereinafter as the "saving lines" or "cost reduction lines" and the "load lines." The instrument according to the present invention does not comprise elements which may be used to represent directly those lines in a similar manner to that in which, e. g., ruler 52 may represent the total cost line. However, the instrument comprises means for greatly facilitating the work of constructing the saving and load lines. Inasmuch as these lines are different in each individual case, they should be entered in a chart on paper or similar material rather than directly on the board 10 unless the latter is of a material permitting the lines of a diagram to be readily erased when the particular diagram is no more needed.

By the terms of "saving lines" and "cost reduction lines," we understand such lines which indicate either what savings or reduction must be made in the constant and/or variable costs if it is desired to shift the break-even point a predetermined distance closer to the zero point which is equivalent to a more profitable business, or, reversely, what the new position of the break-even point will be if predetermined savings will be made. The "load lines" are useful to indicate the indirect costs or groups of indirect costs in percents of selected direct costs, as e. g., costs of labor or material in relation to the turnovers. The problem will be more fully explained with reference to the diagram of Fig. 14. This diagram shows the $x$- and $y$-axes with zero point O. The increments of both co-ordinates are alike, and, consequently, the lead line 87 is at 45° with respect to the axes. It is to be understood, however, that what will be stated with reference to the various lines will be similarly correct also if the increments differ and in consequence, the lead line is at an angle other than 45°. Line 37' represents the constant costs, i. e., its distance from the $x$-axis in the selected scale measure of the $y$-axis is equal to such costs. It is further assumed that for a given turnover OT, the indirect variable costs are equal $ab$, the costs of material $bc$, and the costs of labor $cT'$. Hence, according to the explanation given hereinbefore, the line 55' connecting H and T' is the total cost line which intersects the lead line 87 in the break-even point E. It will be noticed that in the assumed case of Fig. 14, there is a loss according to the distance $T'd$. If, now, E$f$ is drawn parallel to the $x$-axis, and $fg$ made equal HO, then line $g$E which may be extended beyond E is the saving line of reduced constant costs, that means, any point, for instance $h$, on the line $g$E is so correlated to the point of intersection E$_h$ of its ordinate $h$T$_h$ with the lead line 87 that its distance $hi$ from line $f$E in the scale measure of the $y$-axis indicates by what amount the constant costs must be reduced in order to shift the break-even point from E to E$_h$. This statement will be found to be correct if it is considered that a reduction of the constant costs will change the diagram in that both lines 37' and 55' are shifted parallel to themselves downward a corresponding distance. Since, however, $fg$ is made equal HO, $k$E$_h$ must be equal $ih$, wherefrom it follows that by shifting line 55' downward a distance $ih$ it will intersect line 87 in point E$_h$. Another saving line is the curve E$n$ which is the locus of all points, for instance, point $p$, whose distances from the $f$E are indicative of the reduction of variable costs required in order to shift the break-even point from E to the point of intersection of lead line 87 with the ordinate of point $p$. It will be noticed that the distance of point $n$ from line $f$E is equal to the distance $T'a$ because as a matter of course no reduction of the variable costs can occur beyond the actual amount of such costs. Thus, point $n$ indicates a limit whereas the curve $n$E can be continued beyond E to the right, in which case the right-hand leg of the curve would indicate an increase of the variable costs causing a shift of the break-even point toward the right-hand side. Similar considerations apply with respect to the right-hand continuation of the line $g$E as to the constant costs. The curve E$n$ can be plotted by connecting a point $q$ of the line $T'a$ with point H, line H$q$ intersecting OE in point E$_q$. From the point $v$ where the ordinate of E$_q$ intersects the line $f$E, the point $p$ is set off, so that $vp=T'q$. In a similar manner, other points of the curve $n$E can be found by starting from other points $q$ of the line $T'a$.

In many cases it will happen that the required shift of the break-even point cannot be obtained by reducing either the constant costs only or the variable costs only. This means that some reduction will have to take place of the constant costs and some other reduction of the variable costs. In order to meet such condition, it is advisable to plot a series of lines W of which line $g$E is a member and/or a series of curves Z among which curve $n$E belongs. Each of the lines W indicates how much the constant costs must be reduced in addition to a predetermined reduction of the variable costs in order to shift the break-even point to a desired position. If e. g., it has been found that the variable costs may be reduced at most by an amount corresponding in scale measure of the $y$-axis to the distance $T'q_2$, then the distance $st$ of a point $s$ from line $f$E indicates how much the constant costs must be additionally reduced in order to shift the break-even point from E to E$_s$ which has the same ordinate as point $s$. It is advisable to plot the lines W so that the rductions in variable costs to which they are respectively correlated increase from line to line at a constant increment. This means, if, e. g., line $u_1g$ relates to a reduction of an amount $z$ in the variable costs, then line $u_2g$ may relate to a reduction of an amount of $2z$, line $u_3g$ to a reduction of an amount of $3z$, etc. Line E$g$ in this connection may be considered as being related to a reduction in the amount of $0 \times z$. In order to determine the corresponding points $u_1$, $u_2$, $u_3$ on line $f$E from which the lines W originate, it is only necessary to plot lines H$q_1$, H$q_2$, $Hq_3$, etc., from points $q_1$, $q_2$, $q_3$, etc., on line $T'a$ which are spaced equal distances from each other, such as distances $z$ in the above example.

Similarly, it is advisable to plot the curves Z so that the curve starting from the point $r_1$ is valid for a reduction of constant costs in the amount of $1 \times z'$, the curve starting from $r_2$ for a reduction of constant costs in the amount of $2 \times z'$, etc. Thus, for instance, point $s'$ on the same ordinate as $E_s'$ indicates that in order to shift the break-even point from E to $E_s'$ a saving in variable costs corresponding to the distance $s't'$ is required in addition to the predetermined reduction of the constant costs in the amount of $z'$, to which the curve $r_1s'$ relates. In order to plot the series of Z curves, a method is applied similar to that used in connection with the curve $E_n$ which is one of that series. There is this difference, however, that in connection with the curve through $r_1$ the lines from the points $q_1$, $q_2$, $q_3$, etc., of $T'a$ are drawn towards a point $H_1$ on HO which is so defined that $HH_1$ corresponds to the predetermined amount $z'$. This is shown in connection with line $H_1q_5$ which intersects the line EO in the point $E_s''$. By setting off from point $t''$ a distance equal to $q_1q_5$ the point $s''$ of the desired curve through $r_1$ will be found. This is correct because it has been assumed in the present case that $z$ is selected equal to $z'$. If $z$ differs from $z'$, the distance $t''s''$ must be made equal to $T'q_5-HH_1$. The curve through point $r_2$ may be similarly plotted by using $H_2$ as the point with which points $q_2$, $q_3$, $q_4$, etc., are to be connected, and the point $H_2$ is preferably so selected that $HH_1 = H_1H_2$. The lower ends of the curves through $r_1$, $r_2$, $r_3$ are not shown in Fig. 14. In fact, they are not needed because it is obvious that the actual costs of a business cannot be reduced beyond a limited amount. Similarly, the upper legs of the curves through $r_1$, $r_2$, $r_3$ are not shown which may be extended above line $fE$ similarly to the curve $nE$. Now, it will be noticed that the various curves Z and line W indicate different possibilities of shifting the break-even point. If, e. g., the latter shall be shifted from E to $E_s$ this may be accomplished according to the points of intersection of the ordinate of $E_s$ with any one of the intersected curves and lines, this means either by reducing the variable costs according to the distance $ts_3$, or by reducing the constant costs according to the distance $ts_2$, or by reducing the constant costs an amount $z'$ and the variable costs an amount corresponding to the distance $ts_1$, or by reducing the variable costs an amount $z$ and the constant costs an amount corresponding to the distance $ts_1$ because both the line through $u_1$ and the curve through $r_1$ intersect in $s_1$. The user of the chart may accordingly decide which manner will be most favorable or possible in the business under his consideration.

The instrument according to the present invention can be readily adapted and used for plotting the saving lines of the series W and for determining any or practically all points of the saving lines group Z. For this purpose, it is advisable to make certain provisions as to the scale or scales of the slide 80. It has been hereinbefore stated that the slide 80 may have any suitable length, and that its scale starting at the upper edge 82 with zero should be so divided as to indicate percents or decimals of 1. Now, it will be apparent that the percentage scale on the slide does not necessarily need to start at the top edge and to end with its 100% mark coincident with the lower edge 83, it being sufficient for the purpose of finding the economic goodness if the percentage scale is so applied to the slide that the scale can be positioned with its end marks coinciding with two predetermined lines such as the lead line and the abscissa line of the break-even point. The length of the scale and the size of the increments are immaterial as far as the economic goodness is concerned. If, however, the instrument is to be used in connection with the saving lines, it is advisable, that means, it is particularly convenient if the increments of the scale on the slide have the same size as the increments of the scale of the $y$-axis. In that case, the marks between zero and 10 or 100 may be used in determining the economic goodness by reading their respective values in percents, or they may be read in the units of costs applied to the $y$-axis. For that reason, the increments of the scales 81' and 81" on the modified slide 80' of Fig. 11 are like those of the scales 78 and 79 respectively of the vertical ruler 77 which in turn are like those of the $y$-axis as stated above. For sake of convenience, the "10" marks to be read as 100 percent if the economic goodness is to be measured, may be made particularly conspicuous by specific signs such as the arrows 83' and 83". On the other hand, the slide may be extended beyond the mark 83' downward so that its entire length is sufficient to measure the maximum distances involved in the plotting of the saving lines. It will have been noticed that in connection with the measuring of the economic goodness, the scale on the $x$-axis has not been used. In connection, however, with the saving lines, this scale may become helpful. For this reason, additional marks 75' and 76' may be applied to the slide 72 so as to register with the outer edges 84' and 84" of the slide 80 or 80', as shown in Fig. 2.

Now, in using the instrument of Fig. 2 with the slide of Fig. 11 for plotting the lines W and Z, several methods may be employed, only one of which will be described hereinafter with reference to the diagram of Fig. 14. Let it be assumed that in preparing the latter, the scales 20 on the $x$-axis, 21 on the $y$-axis, and consequently, 78 on the ruler 77 have been used.

In the plotting of the saving lines with the instrument of Fig. 2 including the slide of Fig. 11, first the increments $z$ and $z'$ are suitably selected. The smaller these increments are, the greater the possibility is of variations in the amounts of constant and variable costs which can be selected to be reduced. As stated hereinbefore, it is most convenient to choose $z$ and $z'$ equal to the increment of one of the scales of the $y$-axis, for instance, 21, and accordingly use the scale 81' of the slide 80'. The plotting of the lines W is diagrammatically illustrated in Fig. 14a regarding which it has been assumed that the given turnover, the constant and variable costs have the same values as in Fig. 14. Thus, the break-even point E has been found by shifting ruler edges 37 and 55 so as to intersect the $y$-axis at H wherein OH corresponds to the constant costs, and turning 55 so as to intersect the edge of the vertical ruler at T' when this edge is so positioned that OT corresponds to the turnover and TT' to the total costs at such turnover. Now, the slide of the vertical ruler is shifted into the position 81a so that its edge coincides with the line TT' and one of the marks, e. g., the zero mark is on the level of T'. Then, ruler 55 is turned down stepwise and each time it intersects the slide edge at one of the following marks 1, 2, 3, etc., its point of intersection with line OE is marked as indicated at $E_1$, $E_2$, $E_3$, etc. Thereafter, the vertical ruler carrying slide 81' is shifted stepwise towards the right and left. Whenever a selected one of its edges coincides with one of the points $E_1$, $E_2$, . . . , etc., the intersection of said edge with line $fE$ is determined as at $u_1$, $u_2$, $u_3$ . . . , etc. The position of the said edge with reference to points $E_4$ and $u_4$ is indicated at 81b. Then, rulers 37 and 55 are moved upward into the position 37a and 55a respectively in which $fg$ is equal to OH, and, finally, the total cost ruler is stepwise turned from its position 55a so as to intersect the line $Ef$ at the points E, $u_1$, $u_2$, $u_3$, etc., and the lines $gE$, $gu_1$, $gu_2$, etc., are drawn along the ruler edge.

In order to plot the Z-curves, the instrument may be applied in the following manner: The points $u_1$, $u_2$, $u_3$ . . . , etc., are found as described in connection with Fig. 14a. Then, according to Fig. 14b in which these points are entered, the slide 80' is shifted upward until its zero-mark is on the level of the line $fE$. Thereupon, the slide is moved stepwise towards the left-hand side. When its scale-provided edge is at the point $u_1$, that point $p_1$ is marked at which the scale mark "1" is located in this position of the slide. When the edge coincides with the point $u_2$, that means in the position 81c of Fig. 14b, the point $p_2$ is determined where the mark "2" is located. The following points $p_3$, $p_4$, etc., are found by shifting the slide to one of the points $u$, as for instance $u_5$ in the position 81d, and marking that point, for instance $p_5$, coincident with that mark, for instance "5" of the scale which corresponds to the index of the particular point $u_5$. Then, the points E, $p_1$, $p_2$, $p_3$ . . . , etc., form the first of the Z-curves, i. e., the curve $En$, only a portion of which is shown in Fig. 14b.

If it is the intention to plot any one of the other Z-curves, for instance curve $Z_3$ which relates to the savings in variable costs in addition to the predetermined saving of $3 \times z'$, the rulers 37 and 55 are shifted downward a distance $3 \times z'$ to the point $H_3$ without changing their relative position as shown in Fig. 14c. Then, the total cost ruler will indicate the line 55b which intersects the line TT' in the point T''. To this point, the zero mark of the slide scale is applied in the position 81e. In a manner similar to that explained in connection with Fig. 14a, the ruler is stepwise turned down from the position 55b, and the points of intersection $E_{30}$, $E_{31}$, $E_{32}$, etc., are marked each time the ruler coincides with one of the consecutive marks at 81e. Then, the vertical ruler is used to locate the points $r_3$, $u_{31}$, $u_{32}$, $u_{33}$, etc., which lies on the ordinates of the points $E_{30}$, $E_{31}$, $E_{32}$, etc., respectively. Thereafter, the slide is so shifted that its zero mark is on the level of $fE$, and is stepwise advanced towards the left from point $u_{31}$ to each of the following, and the points $p_{31}$, $p_{32}$, $p_{33}$, etc., are set off from line $fE$ as described in connection with the curve $En$.

When sufficient saving lines are entered in the chart of Fig. 14, the required reduction of costs for any desired break-even point can be easily found by shifting the zero mark of scale 81' of the slide of Fig. 11 to the level of line $fE$ and shifting the ruler 77 so that the desired break-even point coincides with the edge 84'. Then, the saving lines will directly indicate at the scale 81' various combinations of reductions of constant and variable costs which will give the desired result. Conversely, if it has been established that certain reductions of costs are feasable, the resulting break-even point will appear as the point of intersection of lead line 87 with edge 84' when the ruler 77 has been so shifted that a suitably selected saving line intersects the same edge at the mark which corresponds to the particular reduction of costs.

It has been heretofore stated that the load line is that line which indicates, in percents of a selected group of direct costs, the amount of indirect costs contained in the total costs of any turnover. Such groups of direct costs are the costs of labor and the costs of material, whereas the indirect costs comprise the constant costs and the variable indirect costs. The load line is required for instance, in order to calculate the total costs for an assumed turnover, if the direct costs are known or can be correctly estimated. In the diagram of Fig. 14 it has been assumed that with a turnover T measured on the scale of the $x$-axis, the total costs are represented by the distance T'T measured in scale measure of the $y$-axis, the constant costs by $aT$, the indirect variable costs by $ab$, the costs of material by $bc$ and the costs of the labor by $T'c$. The percentage of the indirect variable costs in relation to the direct variable costs, and, therefore, also to any group of variable costs, does not change when the turnover is varied, because both kinds of variable costs increase in a linear ratio with the turnover. The percentage of the constant costs in relation to the direct variable costs, however, follows another mathematical law as will be apparent from the description given hereinafter in which the indirect costs by way of example may be assumed to be related to the costs of labor. In Fig. 14, the load line is arranged on top of the break-even chart. For this purpose, a horizontal base-line $b_1$—$b_1$ is drawn. As the percentage of the indirect variable costs in relation to the labor costs do not change with a change in the turnover, it is only necessary to divide the indirect variable costs at any turnover, e. g., turnover T, by the labor costs at the same turnover, that means to express the quotient $ab:T'c$ in percents. This value is set off from the base line $b_1$—$b_1$ in a suitable scale measure which need not have, but preferably has, increments of the magnitude or multiple of the magnitude used in one of the scales of the slide 80 or 80'. Accordingly, the line $c_1$—$c_1$ is plotted whose distance $c_1b_1$ from the base line corresponds to said quotient in the selected scale measure. In order to find the curve which represents the load owing to the constant costs, it is necessary to determine the percentage of constant costs divided by the costs of labor at various turnovers. The required calculation can be greatly facilitated with the aid of the slide rule 86 shown in Fig. 2, and which may be of the conventional logarithmic type. However, we prefer to apply to the scale marks of the slidable scale not the figures of the basic values but their reciprocal values, for instance, in the place of the figure "2" there would be the "5", or in place of the "4" there would be the "2.5", because in that case multiplication can be applied instead of division, so that one adjustment of the slidable scale serves for all fractions having the same denominator. Thus, if for instance, it is intended to determine the points of the load line owing to the constant costs, the left-hand end of the scale of the slide ruler 86 is to be shifted into registry with that mark on the fixed slide rule scale 86c which corresponds to the constant costs. If this is done, any mark on the fixed scale 86c indicates the load percentage which corresponds to the labor costs or other direct variable costs whose pertaining mark on the slidable part 86 is in registry therewith. Now, in order to plot the load line by individual points, the instrument may be used in the following manner with reference to Figs. 14 and 2. First, set the slidable part 86 according to the constant costs OH. Then, shift the vertical ruler to any selected point of the x-axis, for instance, point T, and find with the slide 80' the distance T'c in the scale measure of the y-axis, read on the fixed scale 86c the percentage opposite that value on the slidable element 86 which corresponds to the value measured with slide 80', and set off at $f_1$ the so-found percentage upward from point $g_1$ on line $c_1$—$c_1$. If this is done, the distance $h_1f_1$ is the load in percents of the labor costs when the turnover is T. It will be noticed that in order to determine the points $f_1$, $g_1$ and $h_1$ the vertical ruler is not moved from its original position at T. Now, in order to find another point of the load line, the above-described method may be applied after the vertical ruler has been shifted to another turnover point, for instance, $T_h$ whereby the point $f_2$ will be determined. This may be repeated for any number of points required in order to plot the entire line $d_1$—$d_1$. If the load line is completely drawn, the percentage load in the case of a given turnover can be found by shifting the vertical ruler to the particular turnover point on the x-axis, and, then, reading the percentage, for instance, $f_1g_1$ either with the aid of the slide 80' or on the scale 86d which may be applied for this purpose to the upper portion of the frame member 15. Similarly, if it is questioned what load of indirect costs is to be figured in the case of given labor costs, then both ruler 77 and slide 80' may be so shifted that the upper end of the scale on slide 80' travels along line 55'. When, then the line 54' is in registry with the mark on the said scale which corresponds to the labor costs, the slide 80' is shifted upwards while ruler 77 is held in its position. The edge of the slide 80' will then intersect the load line at the point whose distance from the base line $b_1$—$b_1$ is indicative of the required percentage.

It will be noticed that in the described embodiment of Fig. 2 the y-axis is not directly defined by an edge of a frame element or ruler, although it may be plotted with the aid of a pencil or the like inserted into the hole of the slide 29. In the modification of Fig. 12 the frame member 15 along which the slide 29 is movable is provided with an edge directly representing the y-axis of the system. For this purpose a base plate or strip 160 is attached to the bottom side of the frame member 15 which otherwise may be of a structure like that of Fig. 6. In particular, it may be provided with the slots 25 and 26 into which the slide 29 engages. The latter has the projection 35 to which the ruler 34 is attached and which serves as a bearing for the pivot pin 156. Pin 156 is similar to pin 56 of Fig. 6, with the difference however, that it need not be hollow for the reception of a pencil or the like. Nevertheless, it will be apparent that its axis 157 travelling with the slide along the frame member 15 is determinative of the y-axis of the system. Pin 156 is somewhat shorter than pin 56 so that it ends above the bottom strip or plate 160. This plate projects with its edge 161 laterally of frame member 15, and the arrangement is such that the axis 157 in every position along the frame member 15 coincides with the edge 161. Thus, the edge 161 is indicative of the y-axis of the system, and if the break-even chart is to be drawn, the edge 161 may be used as a guide for the pencil or the like. It goes without saying that base plate 160 and particularly edge 161 may be made of one piece with the frame member 15.

Fig. 15 diagrammatically illustrates another form of the instrument according to our invention. In the illustrated form of Fig. 15 the instrument is simplified in comparison to that of Fig. 2 insofar as the slide on the vertical ruler and/or the scale and pointer arrangement on the slide of the y-axis are omitted. These elements are not required because the economical goodness can be measured by other means as will be described hereinafter. Similarly, specific means for plotting the load curves are not shown in connection with this modified instrument. However, it will be apparent that such means as well as means helpful in the plotting of saving lines may be added in a similar manner and of a similar type to that described in connection with Fig. 2. The modified instrument is designed according to the geometric principle disclosed in Fig. 1.

The embodiment of Fig. 15 comprises a frame 111 which may be readily attachable to and detachable from a base board of the type of the board 10 in Fig. 2. It consists of the four connected members 114 to 117 of which the inner edges of the members 114 and 115 constitute the x- and y-axes of the co-ordinate system, and these members are provided with scales 118 to 121 of the type of the scales 18 to 21. A pivot pin 122 is so arranged at the corner of members 114 and 115 that its axis coincides with the zero point 0 of the x- and y-axes. An element 187 extends from the zero point to the diagonally opposite corner of the frame so as to constitute a line at 45° with respect to the x- and y-axes. It may be provided with a scale 187' having increments which are $\sqrt{2}$ times larger than those of said axes, whereby the figures applied progressively to the marks of the increments form the zero point to the opposite end indicate the ordinates as well as the abscissae of the various points of the 45° line. Three elongated elements such as rulers 150 to 152 are held by the pivot pin 122 so that they may be turned independently of each other about the pin axis, their edges 153 to 155 being arranged radially with respect to the latter. On the frame member 115, slide 129 is shiftably mounted similarly to the slide 29 hereinbefore described. The slide has a pivot pin 156 whose axis travels along the y-axis when the slide is moved up or downward. The pivot pin carries a ruler 134 which can be turned about the pivot and whose edge 137 is radially arranged with respect to the pin axis. The slide 129 is provided with a mark 130 in registry with the pin axis so that the ordinate of the latter can be read as indicated by the mark 130 on scale 119 or 121. A slide 172 with marks 175 and 176 carrying a vertical ruler 177 with scales 178 and 179 is mounted on frame member 114 in a similar manner and for a similar purpose to the corresponding parts 72 and 75 to 79 described in connection with Fig. 2. For reasons to be explained hereinafter, the inner frame member 117 is provided with a scale 129 by dividing its inner edge 123 into ten equal parts counting from zero at the upper end in tenths to +1.0 at the lower end of the edge. The individual scale parts may be further subdivided as indicated for the first tenth. The inner edge 130 of the frame member 116 is also provided with a scale 125 whose increments counting from the zero point of the scale 124 in negative tenths to —1.0 differ from each other. These increments are found as indicated by dotted lines for the first tenth. The line of edge 123 is continued beyond the zero point a distance equal to that of the edge 123 and this continuation is divided into ten equal parts only one of which is indicated in the drawing. The end of each part, for instance point 127 for the first part, is connected by a line such as 128 with the zero point of the co-ordinate system. The points of intersection, for instance 129, of these lines with the edge 130 are the points where the scale marks are to be applied. It goes without saying that the lines 126 and 128 are imaginary only and not present in the finished instrument.

The instrument of Fig. 15 may be used in the following manner. The ruler 177 is shifted to a position according to a given turnover as it has been described in connection with the instrument of Fig. 2. Then, the rulers 150 to 152 are individually turned and so adjusted with respect to the selected scale 178 or 179 that the distance between the x-axis and edge 153, edges 153 and 154, and edges 154 and 155 correspond to the three kinds of variable costs discussed hereinbefore, so that the distance from the x-axis to edge 155 is equivalent to the total variable costs. Then, slide 129 is shifted upward along the y-axis according to the amount of the constant costs and the ruler 134 is so turned that its edge 137 is parallel to edge 155. This can readily be done by adding to the figure of the scale mark on ruler 177 at which the edge 155 points, an amount equal to that according to which the slide 129 has been set, and, then, adjusting edge 137 correspondingly. If this is done, the point of intersection E of edge 137 with the line 187 is the break-even point, and the distance between the line 187 and edge 137 measured along the ordinate of any selected turnover indicates the profit or loss as hereinbefore described The economic goodness defined by the equation $$e = \frac{E}{E_0}$$

wherein F is the amount of the constant costs and $E_0$ the amount equivalent to either one of the ordinates of the break-even point, is directly indicated on the scale 124 by edge 155 of ruler 152 in view of the explanation given in connection with Fig. 1.

Now, it will be apparent that the economic goodness becomes negative when the total variable costs become higher than the pertaining turnover. In that case, edge 155 would lie higher than line 187 and indicate the negative goodness by its position in relation to scale 125 which, owing to its geometrical construction, is a continuation of the scale 124. Theoretically, scale 125 may be continued to $-\infty$. However, this would be unreasonable because a business in which the economic goodness is even as low as —1 would be bad beyond any remedy. Thus, both the scale limits +1 and —1 will not be reached in practice, and if so desired, the scales 123 and 125 may be discontinued at other suitable limits.

Fig. 16 finally, illustrates a modification of a part of the instrument according to Fig. 15. It will have been noticed in connection with the latter that the ruler 134 must be adjusted parallel to ruler 152 in order to permit correct setting of the instrument. Such adjustment is made by setting the ruler 134 in relation to two scales, namely, that of the y-axis and that of the ruler 177. This can be avoided and the slide 129 with pivot 156 can be omitted if two links 235 of equal length are connected to rulers 155 and 234 so as to hold edge 237 parallel to 155. In that case, when ruler 152 is properly adjusted ruler 234 may be so shifted in relation thereto that its edge 237 intersects the y-axis at that scale point which corresponds to the constant costs under consideration. In other respects, the instruments of Figs. 15 and 16 may have features such as described in connection with Fig. 2.

Thus, the three modifications of Figs. 2, 15 and 16 have in common, with respect to the various movable rulers, at least one ruler in each case, viz. rulers 52, 137 and 237 respectively, which has two degrees of freedom of movement one of which is translatory along the y-axis and the other one is rotary about the respective pivot 56, 156 and 122. Furthermore, there may be also one ruler 37 or 152 which has only one of the named degrees of freedom, ruler 37 being free in a translatory sense, whereas 152 is free to be turned. The one ruler with two degrees of freedom, i. e., the ruler indicating total costs is always required to establish the location of the break-even point. The ruler with only one degree of freedom is desirable to distinguish the constant costs from the variable costs. Additional rulers with either two degrees of freedom in Fig. 2, or one degree of freedom in Figs. 15 and 16 are helpful in classifying the different kinds of variable costs.

It will be understood by those skilled in the art that various changes in the specific form of our novel instrument, particularly in the arrangement and configuration of the several parts thereof, may be made without departing from the essence and spirit of our invention. We desire it therefore to be understood that our invention is limited not by the particular disclosure of the specific embodiments thereof illustrated and described hereinabove, but by the scope of the appended claims, it being recognized that various changes in addition to those hereinabove suggested and indicated may be made in the construction and operation of our instrument.

We claim:

1. A management instrument for a business comprising a first fixed member indicative of the first axis of a rectangular co-ordinate system, a second fixed member in rigid connection with said first member and extending parallel to the second axis of said system, said members including turnover and cost scales respectively of constant increments, an element in fixed relationship to said first and second members and indicative of a first straight line extending from the zero point of said system and inclosing with the first axis of the system an angle whose tangent is equal to the quotient of the increment of the scale of said second member divided by that of said first member, and a movable member indicative of a second straight line having a variable point of intersection with said second axis of said system, said movable member being adjustable as to the distance of said variable point from said zero point and as to the inclination of said other straight line in angular relation to the axes of said system, whereby the intersection of said straight lines indicates the break-even point of a business, and, the distance, parallel to said second axis, of any point of said second straight line from said first straight line is a measure for the profit or loss incidental with the turnover according to the distance of such point from said second axis, when the distance of said variable point of intersection from said zero pont is adjusted according to the constant costs, and another point of said second straight line is adjusted according to the total costs incidental with a selected turnover of said business.

2. An instrument as claimed in claim 1, wherein the increments of the one scale are equal to those of the other one, and said angle between said first straight line and said first axis is 45°.

3. An instrument as claimed in claim 1, further comprising a scale along said first straight line, said scale having an increment according to the value of the square root of the sum of the squares of the increments of said scales.

4. A management instrument for a business comprising a first fixed member indicative of the first axis of a rectangular co-ordinate system, a second fixed member in rigid connection with said first member and extending parallel to the second axis of said system, said members including turnover and cost scales respectively of constant increments, an element in fixed relationship to said first and second members and indicative of a first straight line extending from the zero point of said system and inclosing with the first axis of the system an angle whose tangent is equal to the quotient of the increment of the scale of said second member divided by that of said first member, a first movable member indicative of a second straight line and having a variable point of intersection with said second axis of said system, said first movable member having two degrees of freedom of movement relatively to said fixed members, the one degree of freedom being translatory along the second axis of the system and the other being rotary about said point of intersection, and a second movable member indicative of a third straight line intersecting said second axis of the system, said second movable member having an end position in which said third straight line substantially coincides with the first axis of the system and having only one of the two degrees of freedom of movement of said first movable member, whereby said second straight line is adjustable to indicate total costs as a function of turnovers of a business, and said third line is adjustable to divide the total costs into constant and variable costs.

5. A management instrument for a business comprising a first fixed member indicative of the first axis of a rectangular co-ordinate system, a second fixed member in rigid connection with said first member and extending parallel to the second axis of said system, said members including turnover and cost scales respectively of constant increment, an element indicative of a first straight line extending from the zero point of said system and inclosing with the first axis of the system an angle whose tangent is equal to the quotient of the increment of the scale of said second member divided by that of said first member, a first movable member indicative of a second straight line extending radially from the zero point of said system and being rotatable about said zero point, and a second movable member indicative of a third straight line, said second movable member being so adjustable as to its position relatively to said first movable member that said third straight line is parallel to and spaced a selected distance from said second straight line, whereby the intersection of said first and said third straight lines indicates the break-even point when the second straight line is so adjusted that the distances of one of its points from the axes respectively correspond to a selected turnover and the variable costs incidental with such turnover, and the distance measured parallel to the second axis of the third straight line from the second straight line is adjusted according to the constant costs of the business.

6. A management instrument for a business comprising a first fixed member indicative of the first axis of a rectangular co-ordinate system, a second fixed member in rigid connection with said first member and extending parallel to the second axis of said system, said memebrs including turnover and cost scales respectively of constant increments, an element indicative of a first straight line extending from the zero point of said system and inclosing with the first axis of the system an angle whose tangent is equal to the quotient of the increment of the scale of said second member divided by that of said first member, a plurality of first movable members respectively indicative of second straight lines extending radially from the zero point of said system and being rotatable about said zero point, and one second movable member indicative of a third straight line, said second movable member being so adjustable as to its position relatively to a selected one of said first movable members that said third straight line is parallel to and spaced a selected distance from the line of which said selected first movable member is indicative, whereby the intersection of said first and said third straight lines indicates the break-even point when the selected one of said second straight lines is so adjusted that the distances of one of its points from the axes respectively correspond to a selected turnover and the variable costs incidental with such turnover, and the distance measured parallel to the second axis of the third straight line from the selected one of said second straight lines is adjusted according to the constant costs of the business.

7. A management instrument for a business comprising a first fixed member indicative of the first axis of a rectangular co-ordinate system, a second fixed member in rigid connection with said first member and extending parallel to the second axis of said system, said members including turnover and cost scales respectively of constant increments, an element indicative of a first straight line extending from the zero point of said system and inclosing with the first axis of the system an angle whose tangent is equal to the quotient of the increment of the scale of said second member divided by that of said first member, a first movable member indicative of a second straight line parallel to said first axis of the co-ordinate system, said first movable member being adjustable as to its distance from said first fixed member, a second movable member indicative of a third straight line, said second movable member being pivoted to said first movable member so as to be shiftable together with and angularly adjustable in relation to the latter, the pivot axis being so located that said third straight line in any position extends radially from the point of intersection of said second straight line and said second axis of said system, whereby the intersection of said first and third straight line indicates the break-even point if the second straight line is adjusted relatively to said first axis according to the constant costs, and said third straight line relatively to said second straight line according to the variable costs as a function of the turnover of a business.

8. A management instrument for a business comprising a first fixed member indicative of the first axis of a rectangular co-ordinate system, a second fixed member in rigid connection with said first member and extending parallel to the second axis of said system, said members including turnover and cost scales respectively of constant increment, an element indicative of a straight line extending from the zero point of said system and inclosing with the first axis of the system an angle whose tangent is equal to the quotient of the increment of the scale of said second member divided by that of said first member, a first movable member indicative of a second straight line parallel to said first axis of the co-ordinate system, said first movable member being adjustable as to its distance from said first fixed member, a plurality of second movable members each indicative of one of a group of third straight lines, said second movable members being pivoted to said first movable member about a common axis so as to be shiftable together with and individually adjustable in angular relation to said first movable member, the common pivot axis being so located that said third straight lines extend radially from the point of intersection of said first movable member with said second axis of said system, whereby the intersection of a selected one of said third straight lines with said first straight line indicates the break-even point if the second straight line is adjusted relatively to said first axis according to the constant costs, and said selected third straight line relatively to said second straight line according to the variable costs as a function of the turnover of a business.

9. A management instrument for a business comprising a first fixed member indicative of the first axis of a rectangular co-ordinate system, a second fixed member in rigid connection with said first member and extending parallel to the second axis of said system, said members including turnover and cost scales respectively of constant increments, an element indicative of a first straight line extending from the zero point of said system and inclosing with the first axis of the system an angle whose tangent is equal to the quotient of the increment of the scale of said second member divided by that of said first member, a first movable member indicative of a second straight line having a variable point of intersection with said second axis of said system, said movable member being adjustable as to the distance of said point of intersection from said zero point and as to the inclination of said other straight line in angular relation to the axis of said system, and a second movable member indicative of a third straight line parallel to said second axis of said system, said second movable member including a scale having an increment equal to that of the scale of said second fixed member, and being adjustable as to its distance from said second axis of said system, so as to permit the reading of the distances of points on said first and said second lines from said first axis.

10. An instrument as claimed in claim 9 comprising a second scale on each of said fixed members and on said second movable member, the increments of said second scales being equal to each other, and the increments of the first mentioned scales on said fixed members and said second movable member being equal to each other but different from those of said second scales, and two additional straight lines provided on said element and extending from the zero point of said system, one of said additional straight lines inclosing with the first axis of the system, and the other additional straight line inclosing with the second axis of the system an angle whose tangent is equal to the quotient of the increment of the first-mentioned scales divided by the increment of the second scales.

11. A management instrument for a business, comprising a first fixed member indicative of the first axis of a rectangular co-ordinate system, a second fixed member in rigid connection with said first member and extending parallel to the second axis of said system, said members including turnover and cost scales respectively of constant increments equal to each other, an element indicative of a first straight line extending from the zero point of the system at an angle of 45° to the axes of the system, a third fixed member parallel to the second one at a distance therefrom and having a scale whose increment is a decimal fraction of the length of said third member between the first axis of the system and the point of intersection of said first straight line and said third fixed member, and whose zero point coincides with said point of intersection, a first movable member indicative of a second straight line extending radially from the zero point of said system, said first movable member being adjustable in angular relation to said first axis of said system, and a second movable member indicative of a third straight line, said second movable member being adjustable parallel to and at a selected distance from said first movable member, whereby the intersection of said first and said third straight lines indicates the break-even point, and the second straight line indicates the economic goodness at the scale of said third fixed member, when the second straight line is adjusted according to the variable costs and the third straight line according to the total costs as a function of the turnover of a business.

12. A management instrument for a business, comprising a frame including a first side member indicative of the first axis of a co-ordinate system, a second side member close to the zero point and parallel to the second axis of said system, a third side member opposite said first one and a fourth side member opposite the second one, turnover and cost scales on said first and second side members respectively of equal and constant increments, an element indicative of a first straight line at 45° to the axes and extending from the zero point of said system, scales applied to said third and fourth side members and having increments according to the values of 1-tan (45°−α) wherein α is the angle included by said first straight line and a vector with its pole coincident with the zero point of said system, a first movable member indicative of a second straight line extending radially from the zero point of said system, said first movable member being adjustable in angular relation to said first axis of said system, and a second movable member indicative of a third straight line, said second movable member being adjustable parallel to and at a selected distance from said first movable member, whereby the intersection of said first and said third straight lines indicates the break-even point, and the second straight line indicates the economic goodness at one of the scales of said third and fourth side members, when the second straight line is adjusted according to the variable costs and the third straight line according to the total costs as a function of the turnover of a business.

13. A management instrument for a business, comprising a first fixed member indicative of the first axis of a rectangular co-ordinate system, a second fixed member in rigid connection with said first member and extending parallel to the second axis of said system, said members including turnover and cost scales respectively of constant increments, an element indicative of a first straight line extending from the zero point of said system and inclosing with the first axis of the system an angle whose tangent is equal to the quotient of the increment of the scale of said second member divided by that of said first member, a movable member indicative of a second straight line having a variable point of intersection with said second axis of said system, said movable member being adjustable as to the distance of said variable point from said zero point and as to the inclination of said second straight line in angular relation to the axis of said system, a second movable member indicative of a third straight line parallel to said second axis of said system, said second movable member including a scale having an increment equal to that of the scale of said second fixed member, and being adjustable as to its distance from said second axis of said system, and a slide shiftable along said second movable member and including a decimal scale of a predetermined length and having its zero point at its end remote from the first axis of said system, whereby the intersection of said first and said second lines indicates the break-even point, and said second line indicates the economic goodness at the scale of said slide when said second line is adjusted according to the total costs as a function of the turnover of a business, and said slide is adjusted with its zero point coincident with said first straight line and its opposite end on the level of said point of intersection of said first and said second lines.

14. A management instrument for a business, comprising a first fixed member indicative of the first axis of a rectangular co-ordinate system, a second fixed member in rigid connection with said first member and extending parallel to the second axis of said system, said members including turnover and cost scales respectively of constant increments, an element indicative of a straight line extending from the zero point of said system and inclosing with the first axis of the system an angle whose tangent is equal to the quotient of the increment of the scale of said second member divided by that of said first member, a first movable member indicative of a second straight line parallel to said first axis of said system, said member being adjustable as to its distance from said first fixed member, a second movable member indicative of a third straight line through the point of intersection of said second straight line with said second axis of said system, said second movable member being connected to said first movable member pivotally about said point of intersection, a third movable member indicative of a fourth straight line parallel to said second axis of said system, and adjustable as to its distance from said second axis, said third movable member including a scale having an increment equal to that of said second fixed member, and a slide shiftable along said third movable member and including a scale having an increment equal to that of said second fixed member and a length of not less than ten times its increment with its zero point at its end remote from the first axis of said system, whereby the intersection of said first and said third straight lines indicates the break-even point and said third straight line indicates the economic goodness at the scale of said slide when said second line relatively to the first axis is adjusted according to the constant costs, said third straight line relatively to the second line according to the variable costs as a function of the turnover of a business, and said slide with its zero point coincident with said first straight line and another predetermined point of the slide scale on the level of the intersection of said first and said third lines.

15. A management instrument for a business comprising a first fixed member indicative of the first axis of a rectangular co-ordinate system, a second fixed member in rigid connection with said first member and extending parallel to the second axis of said system, each of said members including a scale of a constant increment, a carrier of a straight line extending from the zero point of said system at such an angle with respect to the first axis of the system that the tangent of said angle is equal to the increment of the scale of said second member divided by that of said first member, a slide shiftable along said second fixed member, a pivot on said slide, the axis of said pivot being perpendicular with respect to said second axis and the plane of the co-ordinate system, and a movable member indicative of a second straight line and connected to said pivot so as to be capable of being turned about said pivot axis.

16. An instrument as claimed in claim 15 wherein said slide comprises means to receive therein a drawing utensil such as a pen or pencil with its drawing point coincident with a point of said second axis whereby said second axis can be drawn by moving said slide with said drawing utensil along said second fixed member.

17. A management instrument for a business comprising a first fixed member indicative of the first axis of a rectangular co-ordinate system, a second fixed member in rigid connection with said first member and extending parallel to the second axis of said system, each of said members including a scale of a constant increment, a carrier of a straight line extending from the zero point of said system at such an angle $\beta$ with respect to the first axis of the system that the tangent of said angle $\beta$ is equal to the quotient of the increment of the scale of said second member divided by that of said first member, a slide shiftable along said second fixed member, a pivot on said slide, the axis of said pivot being perpendicular with respect to said second axis and the plane of the co-ordinate system, a movable member indicative of a second straight line and connected to said pivot so as to be capable of being turned about said pivot axis, a third scale on said slide and a pointer in connection with said movable member, and co-operative with said third scale, said third scale having increments according to the values of $$\frac{1-\tan(\beta-\alpha)}{\tan\beta}$$

wherein $\alpha$ is the angle between the directions of said first and said second straight lines.

18. An instrument of the type described comprising a board, a rectangular frame detachably secured to said board and including two connected side members defining the $x$- and $y$-axes respectively of a co-ordinate system, a scale on each of said side members, each of said scales having a constant increment, a line on said board extending from the zero point of said system at an angle to said $x$-axis whose tangent is equal to the quotient of the scale increment of the $y$-axis over that of the $x$-axis, a first movable ruler being adjustable in two kinds of movement, one of which being translatory along the $y$-axis and the other one being rotary about the point of intersection of the direction of its ruling edge with the $y$-axis, a second movable ruler being adjustable in only one of the kinds of movement of said first movable ruler, and a third movable ruler parallel to and adjustable as to its distance from said $y$-axis, said third ruler including a scale like that of the $y$-axis.

19. An instrument as claimed in claim 18 wherein said rulers are movably connected to said frame, said instrument further comprising means for securing a blank of a chart in a predetermined position between said board and said frame with said rulers.

20. An instrument as claimed in claim 18 further comprising means in connection with a third side member of said frame for securing the free ends of said rulers in adjusted positions.

21. An instrument of the type described comprising a board, a rectangular frame detachably secured to said board and including two connected side members defining the $x$- and $y$-axes respectively of a co-ordinate system, a scale on each of said side members, each of said scales having a constant increment, a line on said board extending from the zero point of said system at an angle to said $x$-axis whose tangent is equal to the quotient of the scale increment of the $y$-axis over that of the $x$-axis, a first movable ruler parallel to said $x$-axis and being adjustable as to its distance therefrom, whereby the line defined by the ruling edge of said first ruler has a variable point of intersection with said $y$-axis, at least one second movable ruler capable of being turned about an axis perpendicular to the plane of the system and through said variable point of intersection, said second ruler being so arranged that a line defined by its ruling edge passes through said point of intersection, said second ruler being adjustable as to the angle it incloses with said first movable ruler, a third movable ruler parallel to the $y$-axis and being adjustable as to its distance therefrom, and a scale on said third ruler like that of said $y$-axis.

22. An instrument of the type described comprising a board, a rectangular frame detachably secured to said board and including two connected side members defining the $x$- and $y$-axes respectively of a co-ordinate system, a scale on each of said side members, each of said scales having a constant increment, a line on said board extending from the zero point of said system at an angle to said $x$-axis whose tangent is equal to the quotient of the scale increment of the $y$-axis over that of the $x$-axis, a first movable ruler parallel to said $x$-axis and being adjustable as to its distance therefrom whereby the line defined by the ruling edge of said first ruler has a variable point of intersection with said $y$-axis, at least one second movable ruler capable of being turned about an axis perpendicular to the plane of the system and through said variable point of intersection, said second ruler being so arranged that a line defined by its ruling edge passes through said point of intersection, said second ruler being adjustable as to the angle it incloses with said first movable ruler, a third movable ruler parallel to the $y$-axis and being adjustable as to its distance therefrom, a scale on said third ruler like that of said $y$-axis, and means in connection with one of said rulers for reading the value of the quotient of the distance of the ruling edge of said first ruler from the $x$-axis divided by the distance of the point of intersection of the ruling edge of said second ruler with said line on said board.

23. In an instrument of the type described, the combination of three rulers with edges extending radially from a common pole, at least two of said rulers being angularly adjustable with respect to the third ruler, a slidable scale-provided member indicative of a straight line in a direction predetermined so as to intersect the lines defined by said ruler edges, the increments of the scale being decimal fractions of the length of said scale, first means to guide said member in the direction of the line indicated by it, and second means to guide said first means at right angles to the last-mentioned direction.

ALFRED F. SCHLOMANN.
ALFRED SCHWARZ.